(12) United States Patent
Bonang et al.

(10) Patent No.: US 12,545,382 B2
(45) Date of Patent: Feb. 10, 2026

(54) METHODS, APPARATUSES, AND SYSTEMS FOR UNMANNED UNDERWATER VEHICLES

(71) Applicant: THE BOEING COMPANY, Chicago, IL (US)

(72) Inventors: James J. Bonang, Garden Grove, CA (US); Thomas J. Stepp, Long Beach, CA (US); William J. Wood, Dove Canyon, CA (US); Jeremy Whitcher, Huntington Beach, CA (US)

(73) Assignee: The Boeing Company, Arlington, VA (US)

( * ) Notice: Subject to any disclaimer, the term of this patent is extended or adjusted under 35 U.S.C. 154(b) by 1179 days.

(21) Appl. No.: 17/448,136

(22) Filed: Sep. 20, 2021

(65) Prior Publication Data
US 2025/0289544 A1    Sep. 18, 2025

(51) Int. Cl.
  *B63B 35/08*   (2006.01)
  *B63B 22/00*   (2006.01)
  (Continued)

(52) U.S. Cl.
  CPC ............ *B63G 8/001* (2013.01); *B63B 22/003* (2013.01); *B63B 35/08* (2013.01); *B63G 8/04* (2013.01);
  (Continued)

(58) Field of Classification Search
  CPC . B63G 8/00; B63G 8/001; B63G 8/04; B63G 2008/004; B63B 22/00;
  (Continued)

(56) References Cited

U.S. PATENT DOCUMENTS 3,368,480 A    2/1968  Payne et al.
5,014,248 A    5/1991  Feltz et al.
(Continued)

OTHER PUBLICATIONS

Allen, Ben et al., "Autonomous Docking Demonstrations with Enhanced REMUS Technology," Woods Hole Oceanographic Institution, OCEANS 2006 Conference Paper, 7 pgs., (Oct. 2006).
(Continued)

*Primary Examiner* — Lars A Olson
(74) *Attorney, Agent, or Firm* — Harrity & Harrity, LLP

(57) ABSTRACT

The present disclosure relates to methods, apparatuses, and systems for unmanned underwater vehicles capable of operation in the Arctic region. An example unmanned underwater vehicle includes: a hull; one or more guide rails extending from the hull and attached to the hull by one or more legs; a vertically-deployed mast, wherein the vertically-deployed mast is configured to penetrate through an ice sheet; and a communications antenna, wherein the communications antenna is deployed with the vertically-deployed mast and enables communication above the ice sheet. The dorsally-located guide rails of an example define an extended position and a retracted position, wherein the guide rails disposed in the extended position are disposed further from the hull than the guide rails disposed in the retracted position. Embodiments described herein include systems employing air-deployable buoys, water-deployed buoys and small UUVs, and ice-penetrating buoys to support communications in the Arctic region.

20 Claims, 18 Drawing Sheets

(51) Int. Cl.
*B63G 8/00* (2006.01)
*B63G 8/04* (2006.01)

(52) U.S. Cl.
CPC ..... *B63B 2022/006* (2013.01); *B63B 2201/20* (2013.01); *B63G 2008/004* (2013.01)

(58) Field of Classification Search
CPC ....... B63B 22/003; B63B 35/00; B63B 35/08; B63B 2201/20; B63B 2022/006
USPC .......................................................... 114/312
See application file for complete search history.

(56) References Cited

U.S. PATENT DOCUMENTS

| | | | |
|---|---|---|---|
| 5,022,470 | A | 6/1991 | Andersen et al. |
| 5,319,376 | A | 6/1994 | Eninger |
| 5,593,332 | A | 1/1997 | Green |
| 5,690,041 | A * | 11/1997 | Hillenbrand ........... B63G 8/001 |
| | | | 114/317 |
| 6,183,326 | B1 | 2/2001 | Stein et al. |
| 6,380,889 | B1 | 4/2002 | Herrmann et al. |
| 2010/0291817 | A1 | 11/2010 | Legnos et al. |
| 2015/0375840 | A1 | 12/2015 | Stowers |
| 2020/0400804 | A1 | 12/2020 | Bonang et al. |

OTHER PUBLICATIONS

Sutton, H.I., "The U.S. Navy's New Orca Drone Submarine Could Get Offensive Role," Forbes, 4 pgs., (Dec. 17, 2019).
Yang, Canjun et al., "Improving Steady and Starting Characteristics of Wireless Charging for an AUV Docking System," IEEE Journal of Oceanic Engineering, 45(2):430-441, (Apr. 2020).

* cited by examiner

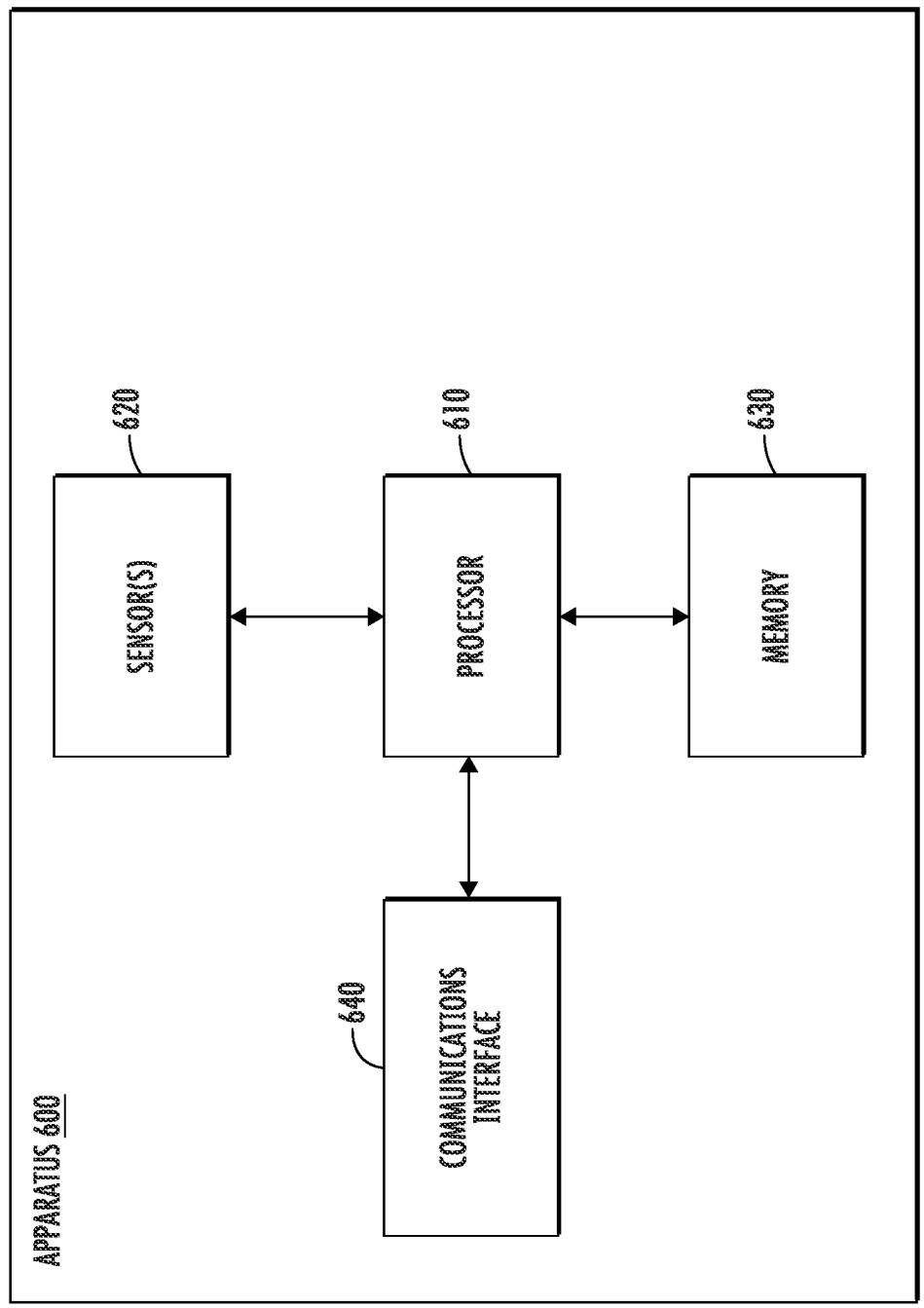

METHODS, APPARATUSES, AND SYSTEMS FOR UNMANNED UNDERWATER VEHICLES

TECHNOLOGICAL FIELD

The present invention relates to unmanned underwater vehicles, and more particularly, to methods, apparatuses, and systems for unmanned underwater vehicles capable of operation in the Arctic environment.

BACKGROUND

The Arctic region is taking on expanded strategic and commercial importance as the extent of the ice sheet recedes, opening up navigable sea lanes and allowing greater access to natural resources. While nuclear submarines have plied the Arctic Ocean since the submerged polar transit of the U.S.S. Nautilus in 1958, conventional submarines have been limited to short excursions under the ice shelf. Non-nuclear Unmanned Underwater Vehicles (UUVs) are similarly constrained but may be adapted to perform extended under-ice operations.

UUVs must communicate intermittently with their controllers when operating under the ice sheet as well as navigate and recharge batteries. The ice sheet blocks reception of Global Positioning System (GPS) signals for navigation as well as radio signals for communication. It also precludes ingesting air and venting exhaust necessary to run diesel engines used to recharge batteries. To enable communication and navigation, not only must the underwater vehicles themselves be adapted but so must the systems including their supporting infrastructure.

BRIEF SUMMARY

Provided herein are methods, apparatuses, and systems for unmanned underwater vehicles capable of operation in Arctic environments. Embodiments provided herein include a system including: an unmanned underwater vehicle (UUV) including a hull, where the UUV includes one or more attached guide rails positioned above the hull of the UUV; a vertically-deployed mast, where the vertically-deployed mast is configured to penetrate through an ice sheet forming a penetration; and a communications antenna, where the communications antenna is deployed to extend through the penetration in the ice sheet and enables communication above the ice sheet. The one or more attached guide rails positioned above the hull of the UUV define, in an example embodiment, an extended position and a retracted position, where the one or more attached guide rails disposed in the extended position are disposed further from the hull than the one or more attached guide rails disposed in the retracted position.

According to an example embodiment, the system further includes a conduit attached to the UUV and extending above the UUV, where the conduit includes an open end opposite a first end that is attached to the UUV, where the open end of the conduit extends above the one or more attached guide rails when the guide rails are in the retracted position, and below the one or more attached guide rails when the guide rails are in the extended position. The conduit of an example embodiment is retractable to position the open end closer to the UUV than the one or more attached guide rails. The conduit of an example embodiment is configured to extend through the ice sheet to conduct intake air for combustion in an engine of the UUV, where the engine of the UUV charges batteries that power propulsion of the UUV. The one or more attached guide rails of an example embodiment are attached to the UUV with a shock absorbing feature, where the shock absorbing feature includes hydraulic or mechanical shock absorbing legs.

An example embodiment of the system further includes one or more deployable buoys, where the one or more deployable buoys, when deployed by the UUV at predetermined intervals and at a predetermined depth beneath the ice sheet, form an extended range communications network with the UUV beneath the ice sheet. The one or more deployable buoys of an example embodiment include one or more deployable sonobuoys, where the one or more deployable sonobuoys are deployed through a launch bay of the UUV and recovered through a recovery bay of the UUV. At least one of the one or more deployable buoys includes, in some embodiments, an antenna deployed upon penetration of the ice sheet. The ice-penetrating buoy of an example embodiment includes a heated surface, where the heated surface is used to melt and penetrate the ice sheet. The ice-penetrating buoy of an example embodiment includes a payload of a sub-surface component, where the sub-surface component descends to a predetermined depth in response to being deployed. The sub-surface component of an example embodiment is an acoustic modem, where the predetermined depth is determined based on a thermocline layer where signal transmission distance is maximized to establish a communication network between the UUV and the acoustic modem.

Embodiments provided herein include an unmanned underwater vehicle including: a hull; one or more guide rails extending from the hull and attached to the hull by one or more legs; a vertically-deployed mast, where the vertically-deployed mast is configured to penetrate through an ice sheet forming a penetration; and a communications antenna, where the communications antenna is deployed to extend through the penetration in the ice sheet and enables communication above the ice sheet. The one or more guide rails of an example embodiment are positioned above the hull of the UUV and define an extended position and a retracted position, where the guide rails disposed in the extended position are disposed further from the hull than the guide rails in the retracted position.

According to an example embodiment, the one or more legs includes telescoping legs, where the telescoping legs move the one or more guide rails between the extended position and the retracted position. The telescoping legs of an example embodiment are further configured to bias the one or more guide rails in the extended position and to absorb shock from the one or more guide rails, reducing shock experienced by the UUV when the one or more guide rails impacts an object. An example embodiment of the UUV further includes a plurality of deployable buoys, where the UUV includes a launch bay to deploy the deployable buoys, and a recovery bay to recover the deployable buoys. An example embodiment of the UUV further includes at least one deployable buoy, where the at least one deployable buoy includes an ice-penetrating buoy, where the ice-penetrating buoy includes an antenna deployed in response to penetration of the ice sheet.

Embodiments provided herein include a method for establishing a communications network including: deploying, from an unmanned underwater vehicle, one or more ice-penetrating buoys; penetrating an ice sheet with the one or more ice-penetrating buoys; extending an antenna from the one or more ice-penetrating buoys in response to the one or more ice-penetrating buoys reaching a surface above the ice sheet; deploying, from the UUV, one or more sonobuoys;

and communicating between the one or more ice-penetrating buoys, the one or more sonobuoys, and the UUV. An example embodiment of a method for establishing a communications network further includes communicating from the one or more ice-penetrating buoys, the one or more sonobuoys, and the UUV with a central command using the antenna extending above the surface of the ice sheet. An example embodiment of a method for establishing a communications network further includes vertically-deploying a mast through the ice sheet using a heated surface of the mast to penetrate through the ice sheet, and deploying an antenna from the mast to facilitate communications

BRIEF DESCRIPTION OF THE DRAWINGS

Figure 1:
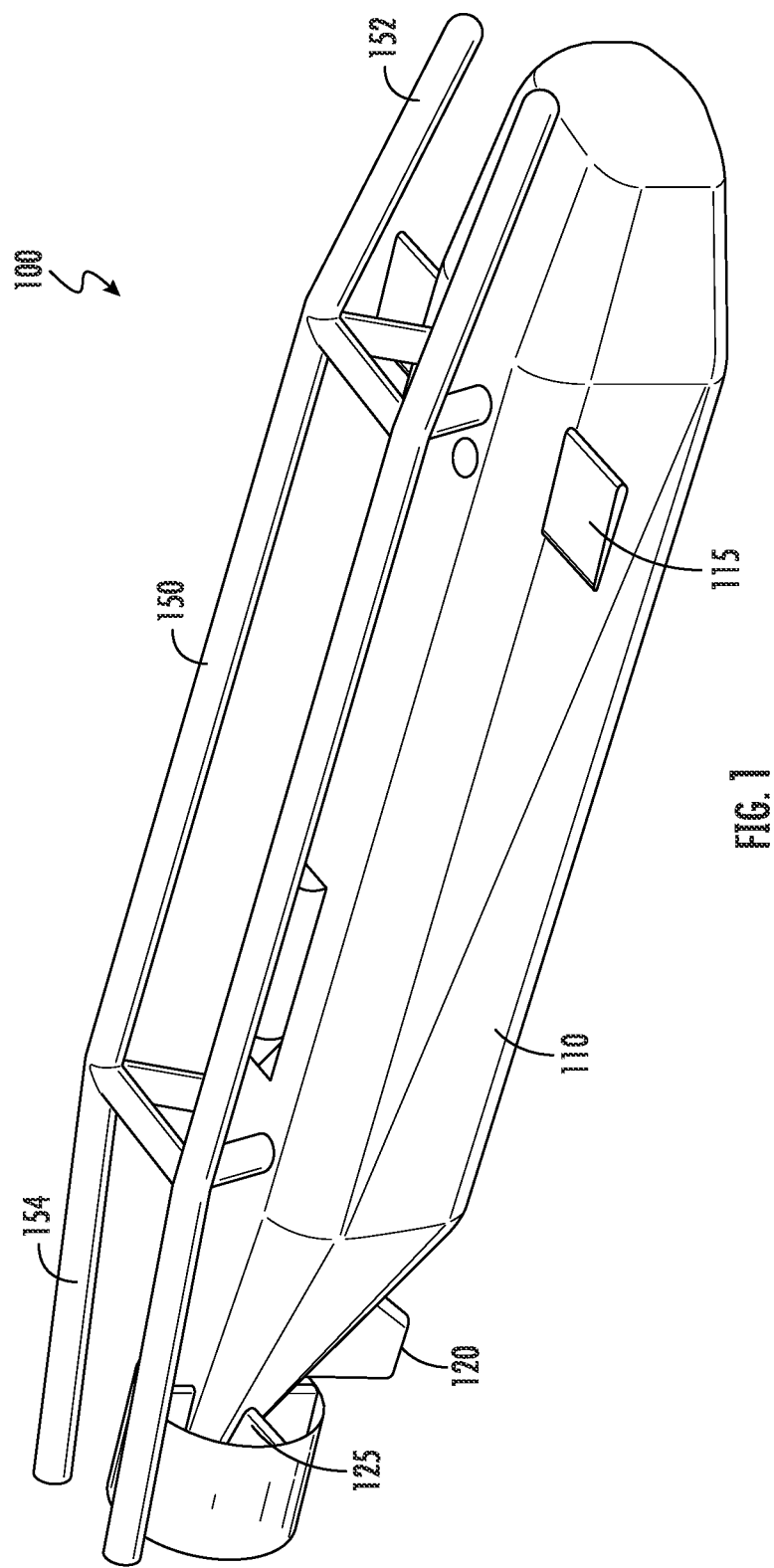
Figure 2:
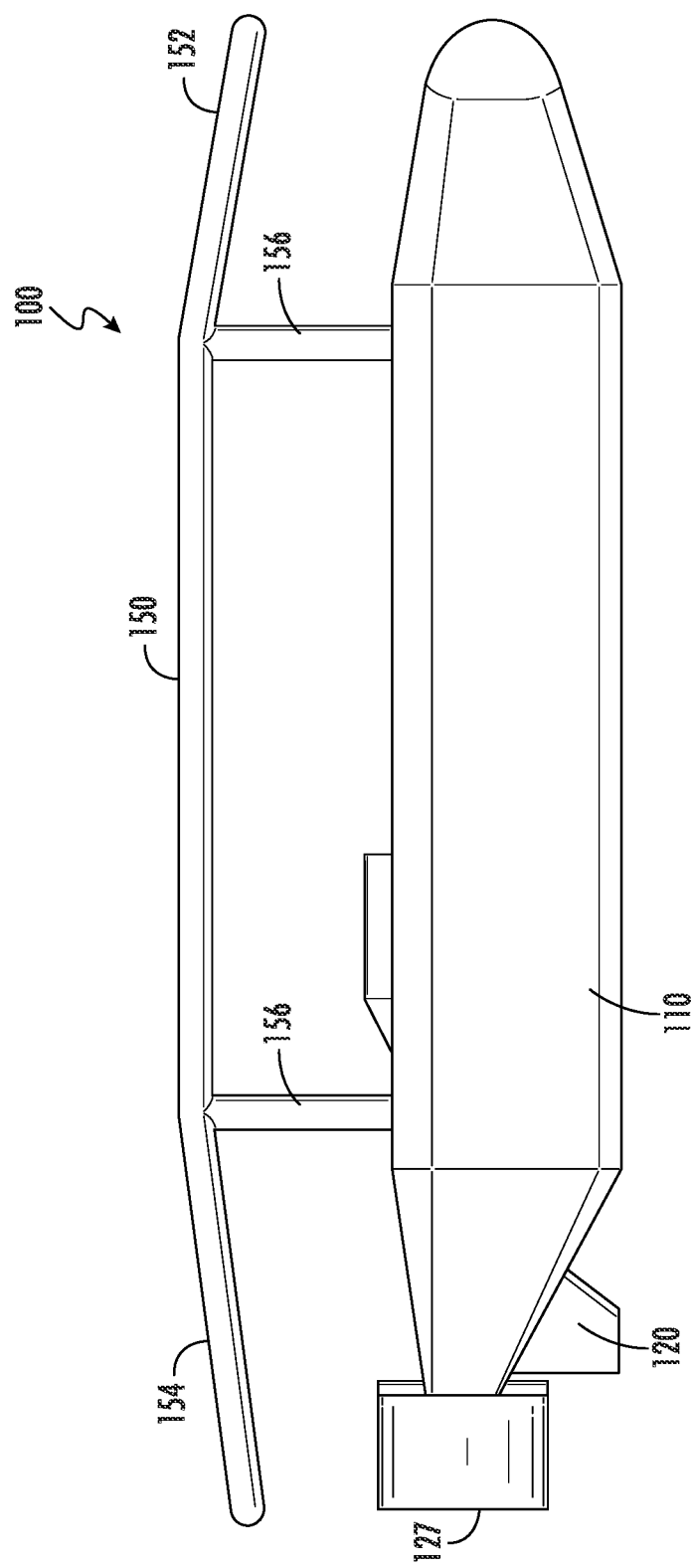
Figure 3:
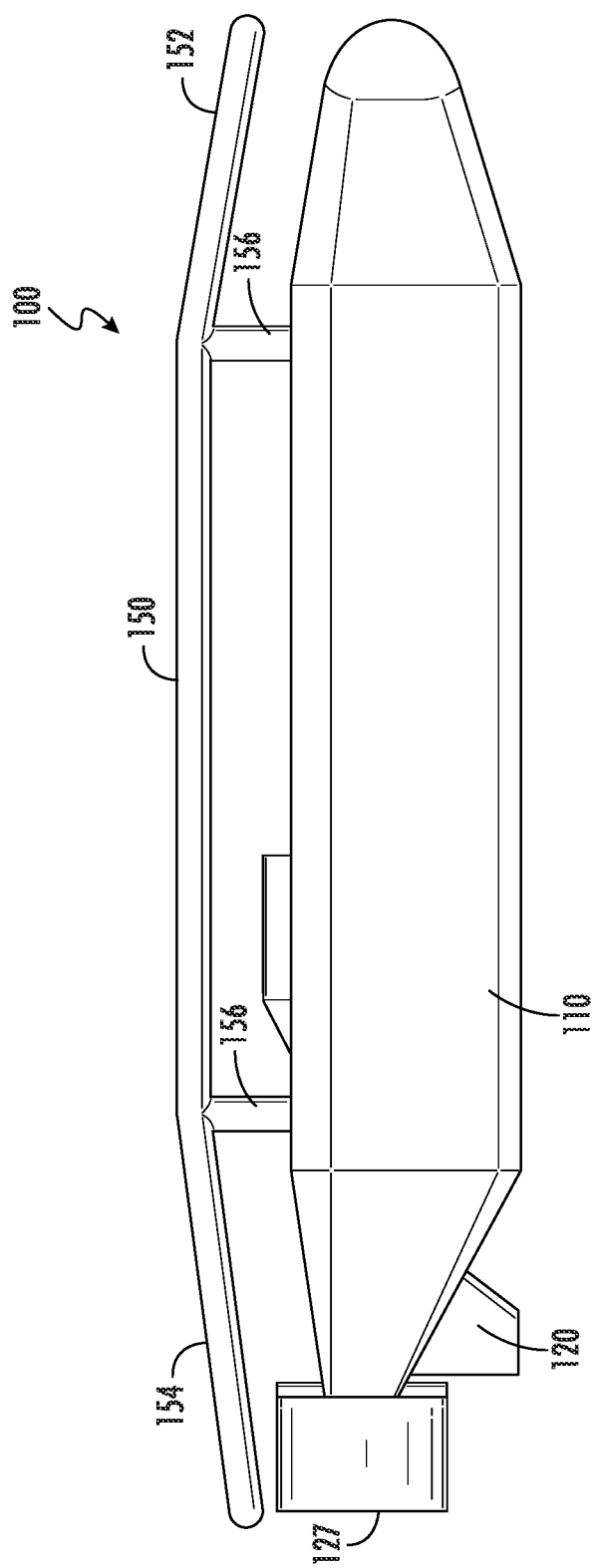
Figure 4:
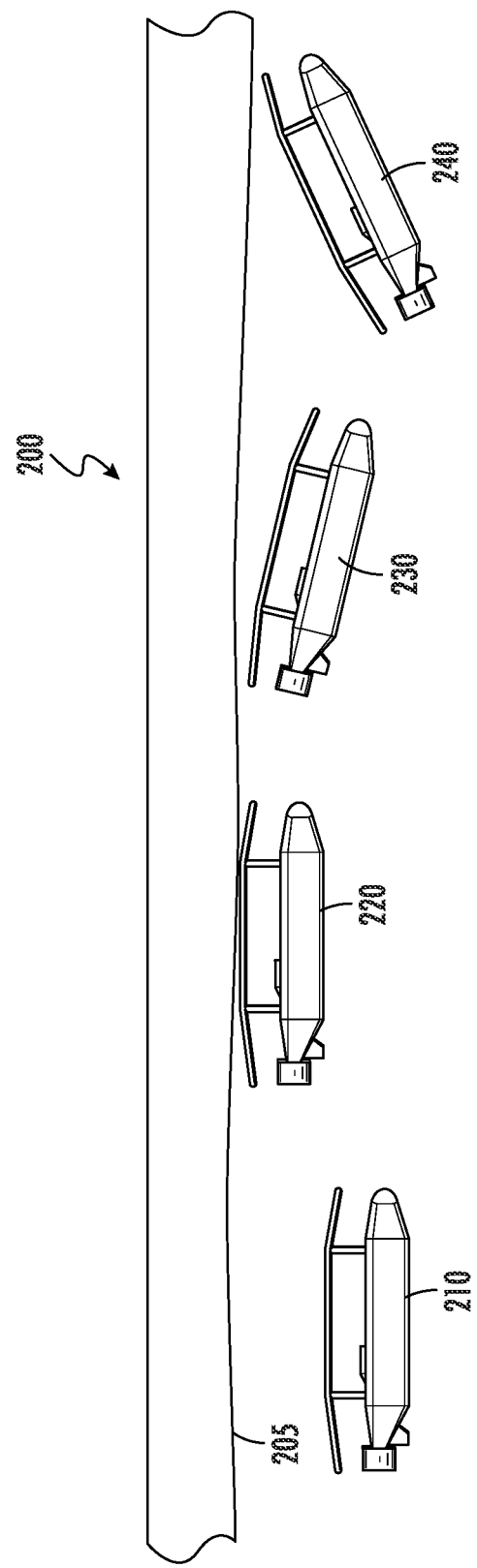
Figure 5:
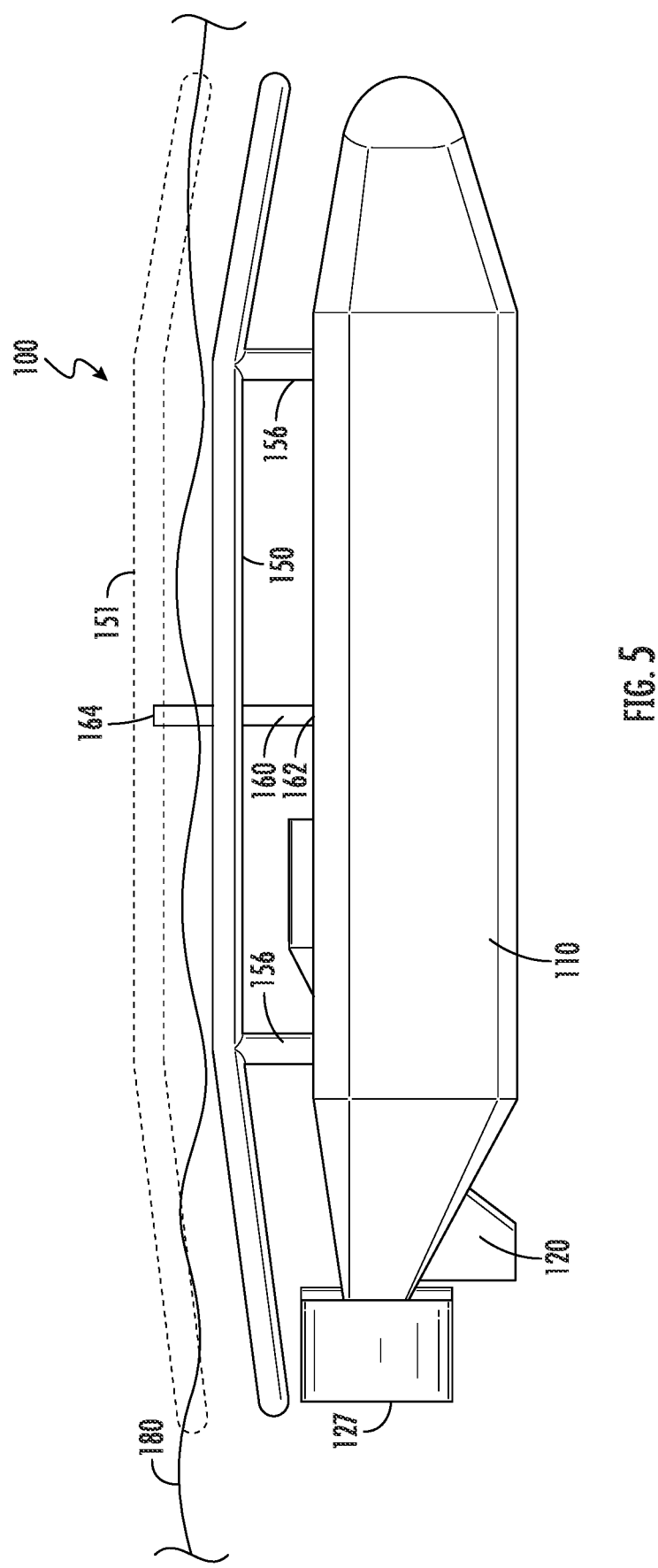
Figure 6A:
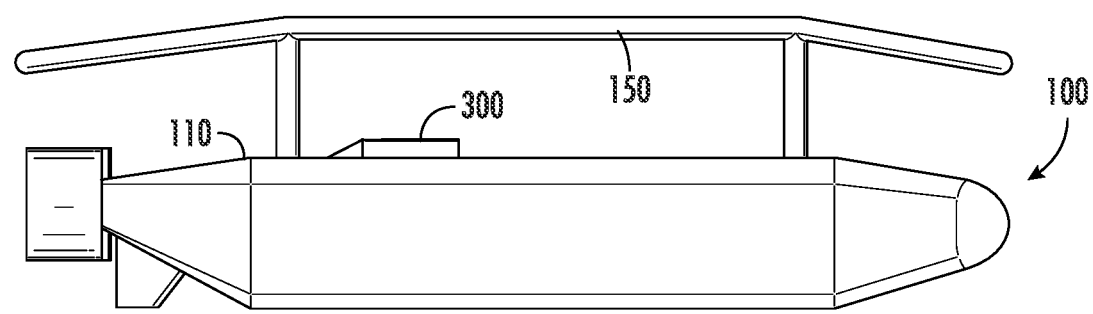
Figure 6B:
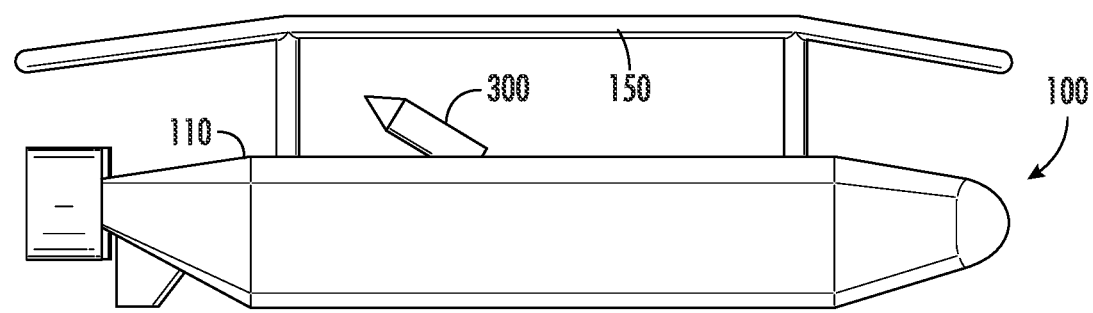
Figure 6C:
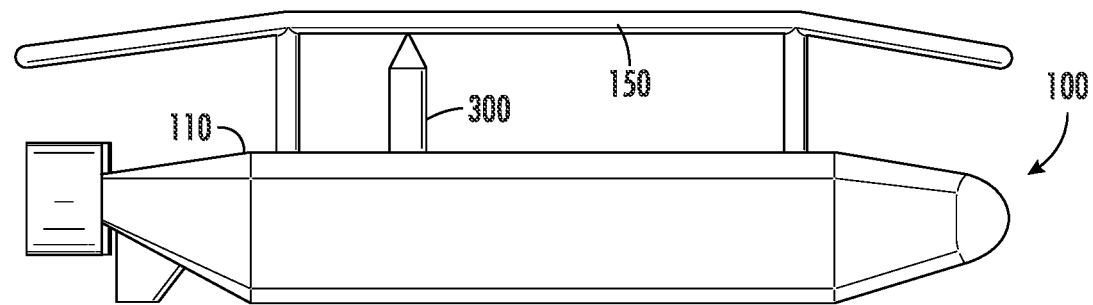
Figure 8A:
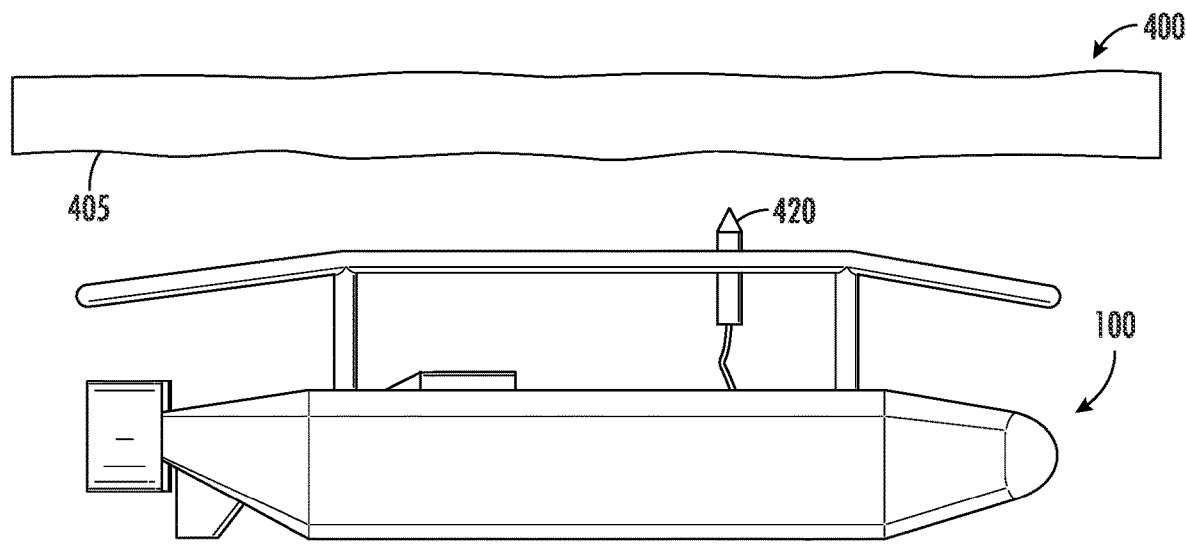
Figure 8B:
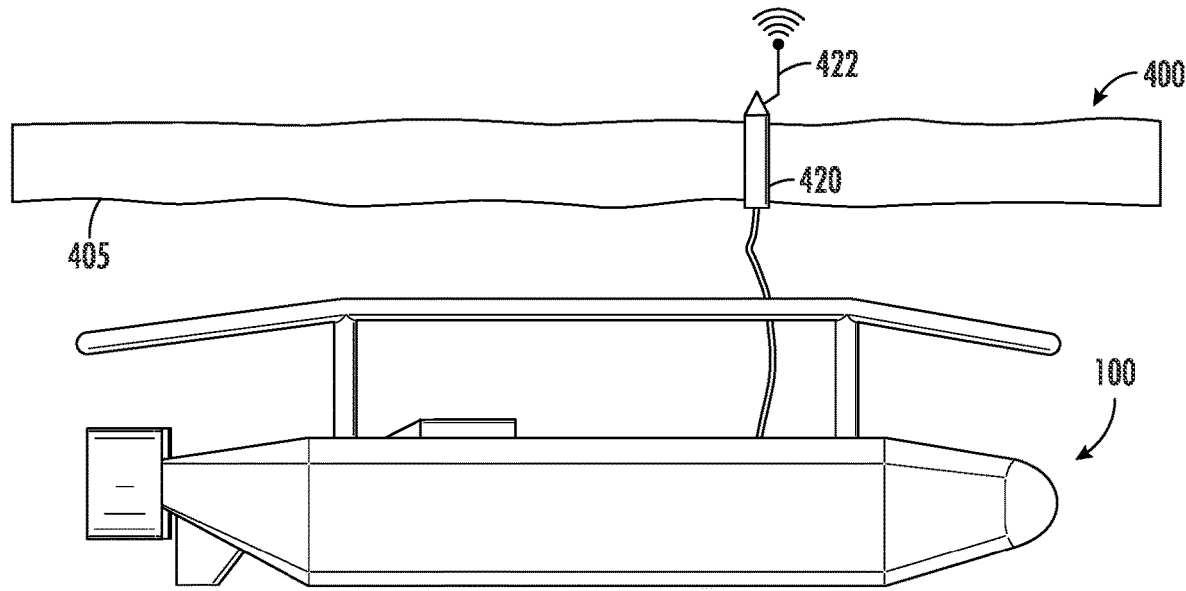
Figure 9:
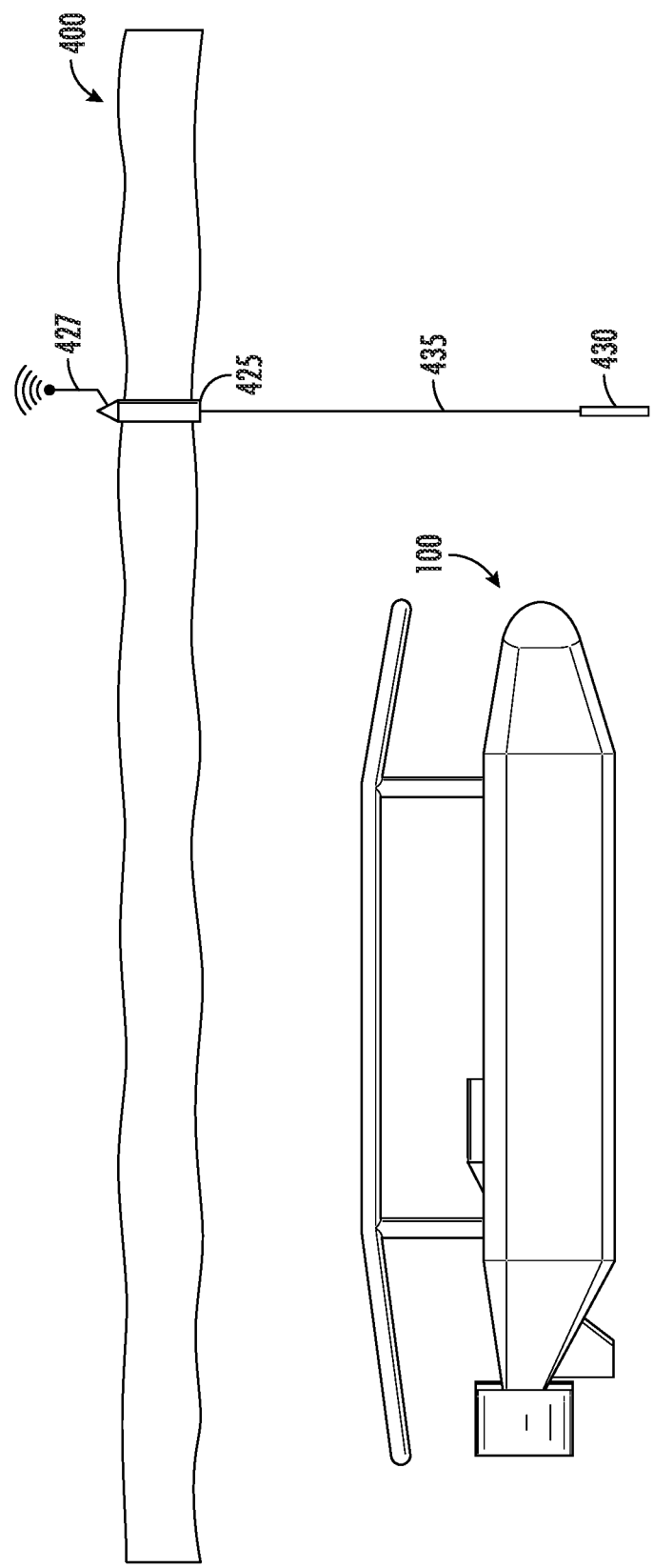
Figure 10:
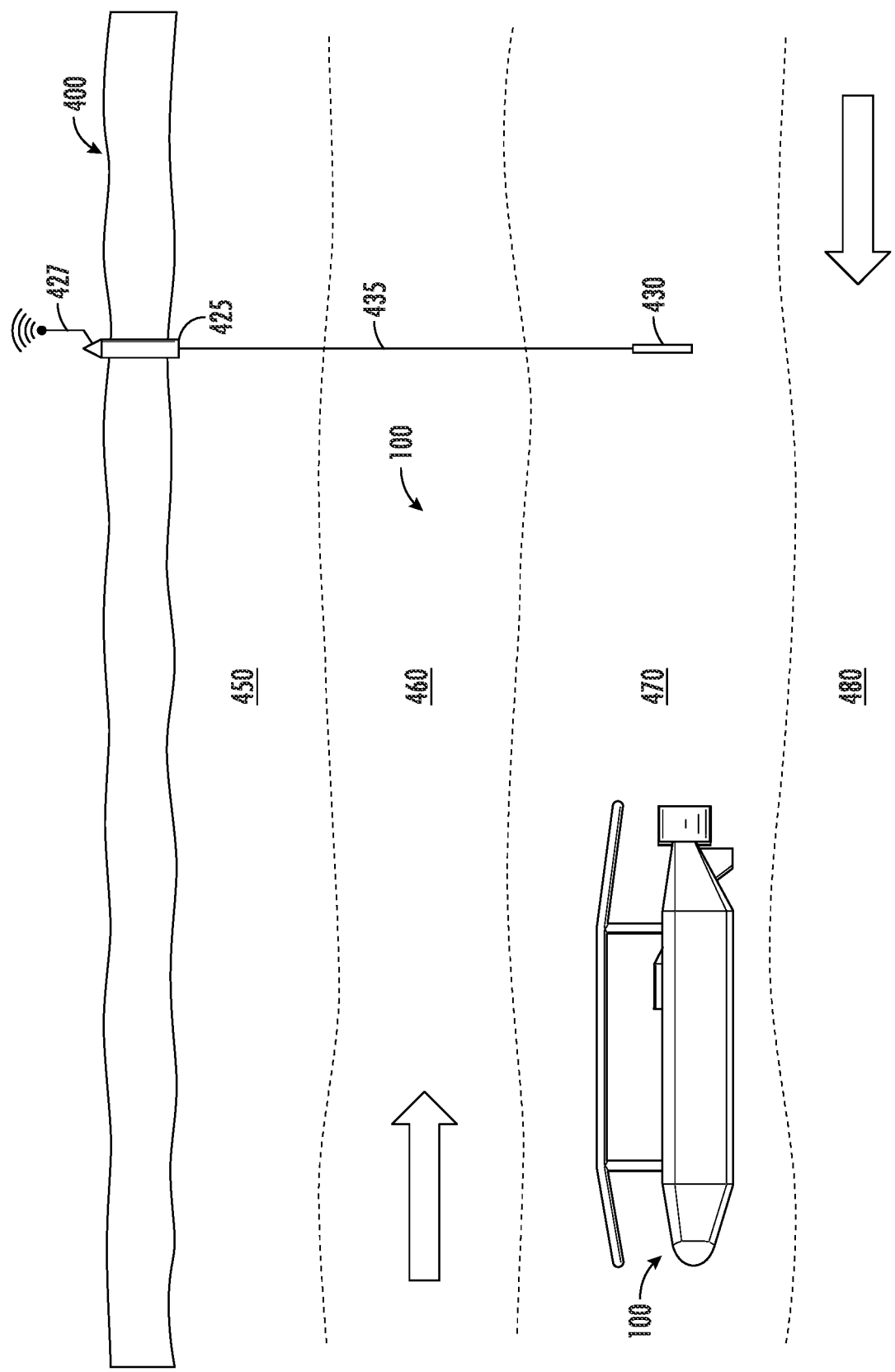
Figure 11:
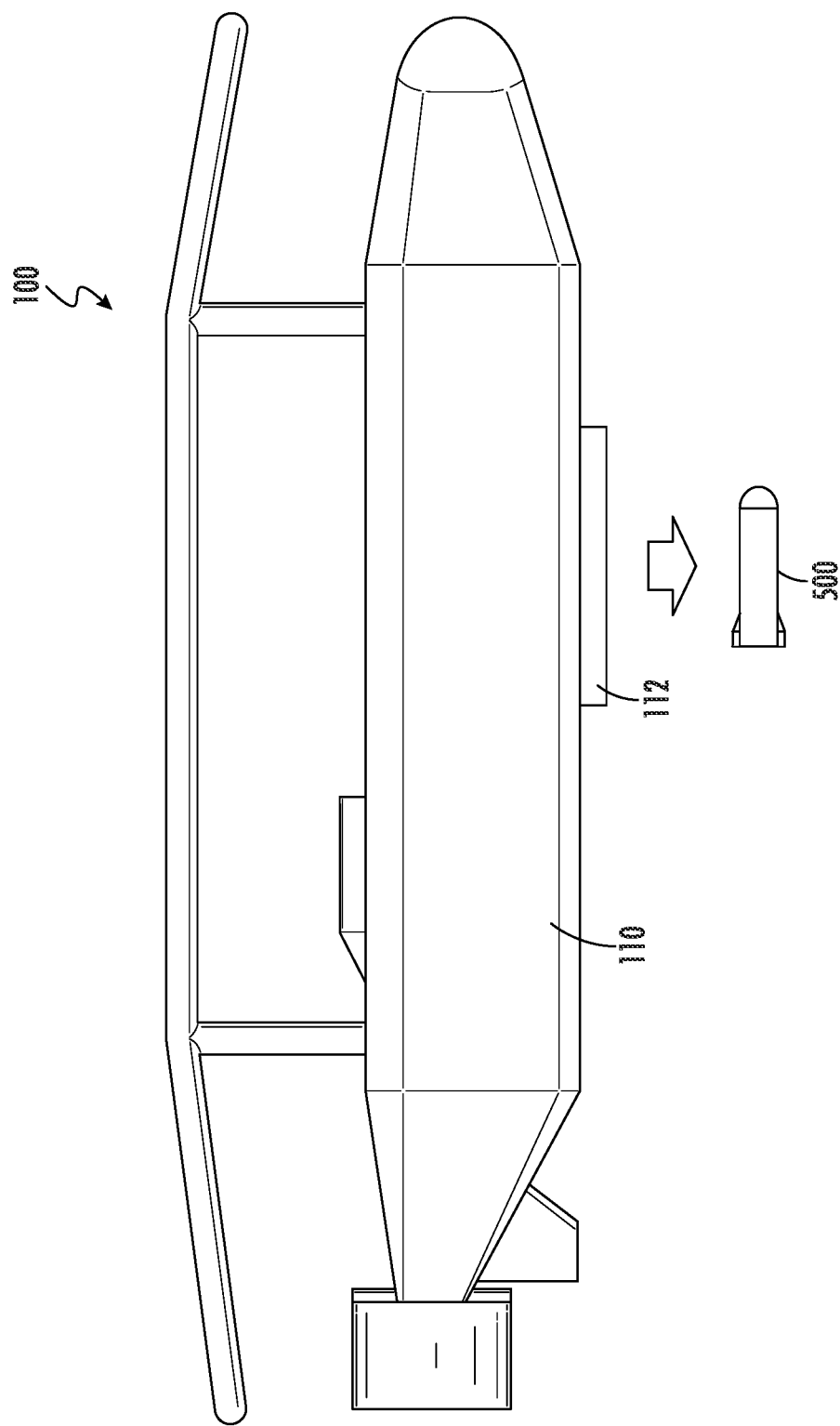
Figure 12:
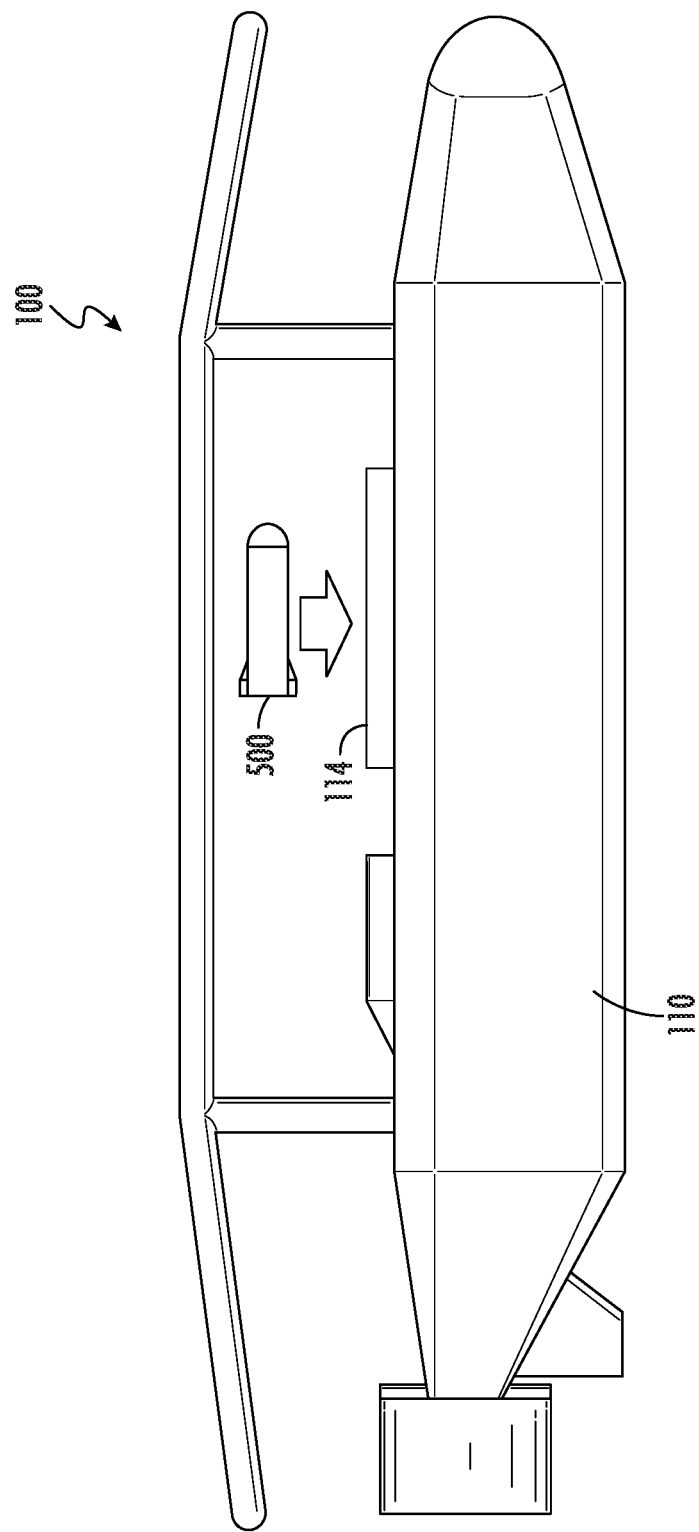
Figure 13:
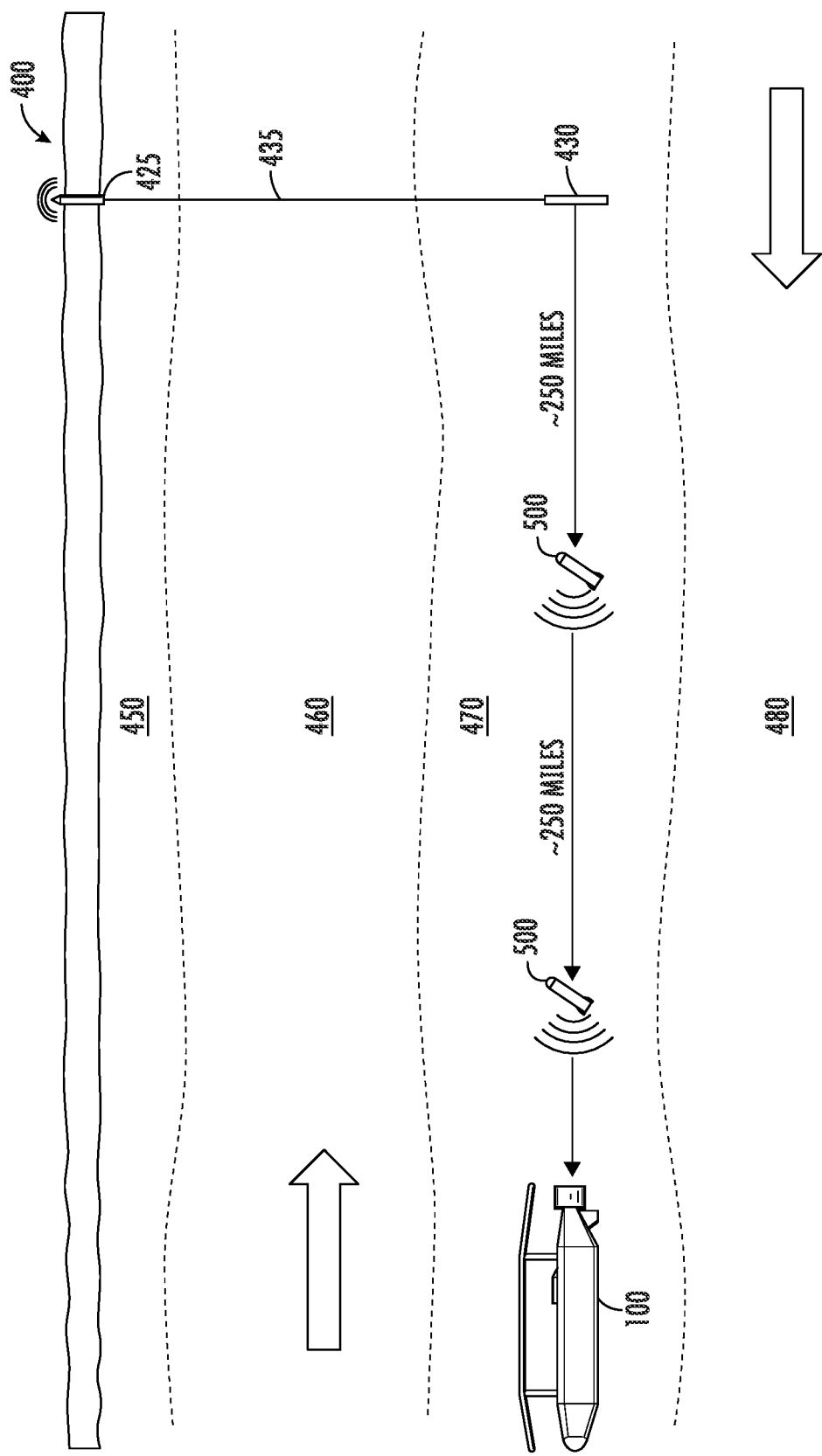
Figure 14:
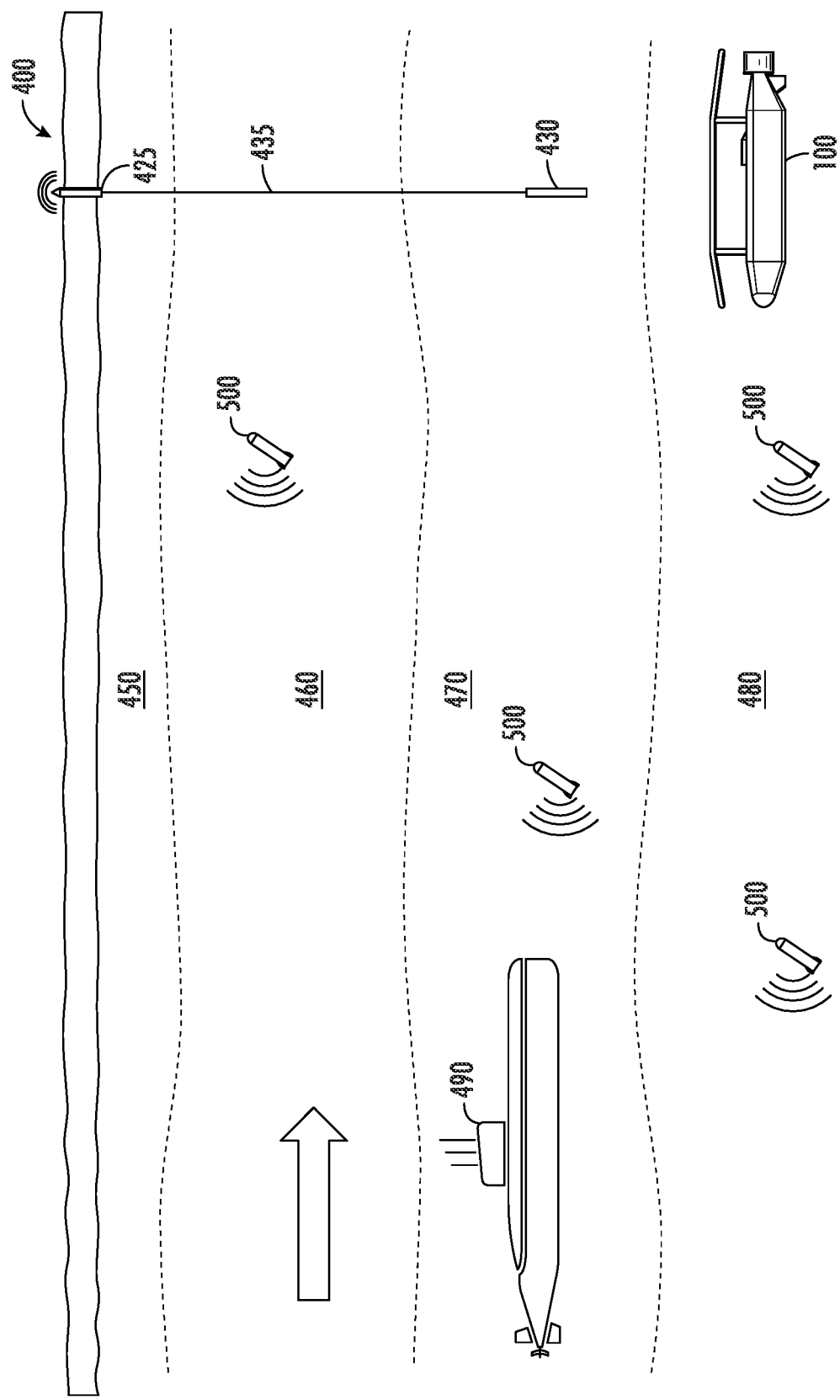
Figure 5:
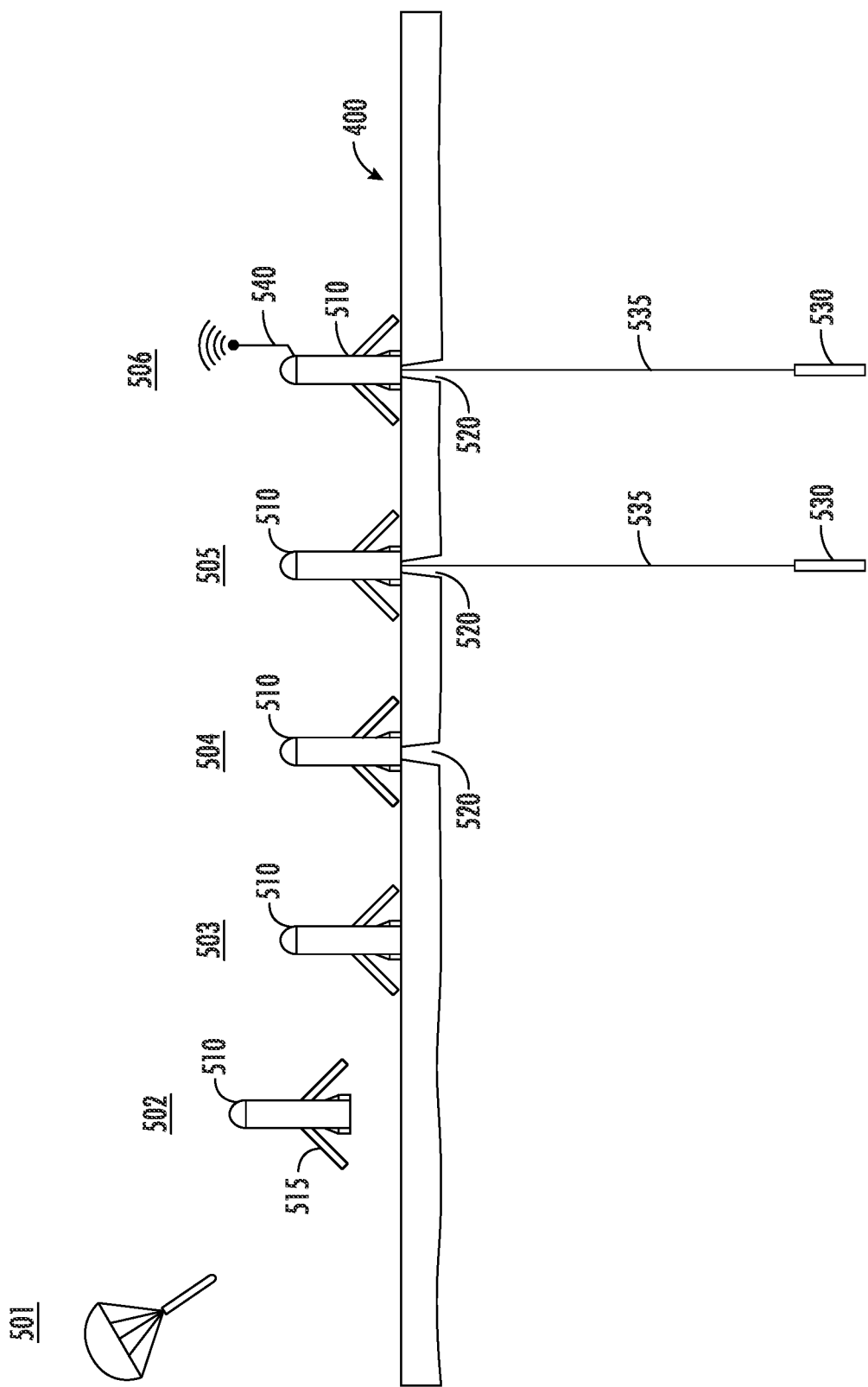
Figure 16:
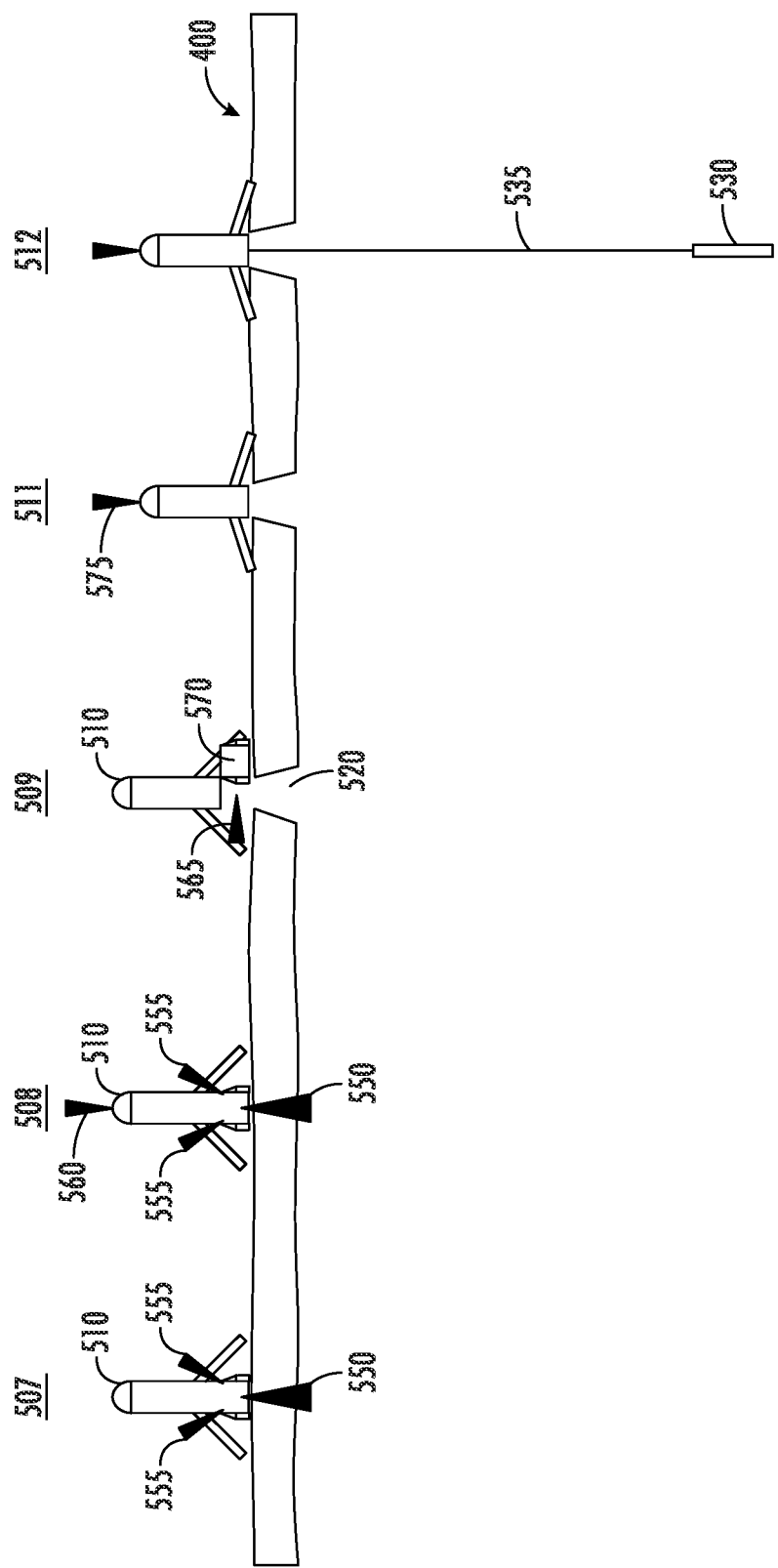

Having thus described the invention in general terms, reference will now be made to the accompanying drawings, which are not necessarily drawn to scale, and wherein:

FIG. 1 illustrates an unmanned underwater vehicle according to an example embodiment of the present disclosure;

FIG. 2 illustrates an unmanned underwater vehicle with guide rails disposed in an extended position according to an example embodiment of the present disclosure;

FIG. 3 illustrates an unmanned underwater vehicle with guide rails disposed in a retracted position according to an example embodiment of the present disclosure;

FIG. 4 illustrates an unmanned underwater vehicle including guide rails in several positions relative to an ice sheet according to an example embodiment of the present disclosure;

FIG. 5 illustrates an unmanned underwater vehicle in a snorkeling position using conduit to reach above the surface of the water according to an example embodiment of the present disclosure;

FIGS. 6A-6C illustrate an unmanned underwater vehicle deploying an ice-penetrating mast up to the point prior to ice penetration according to an example embodiment of the present disclosure;

FIGS. 7A-D illustrate deployment of an ice-penetrating mast of an unmanned underwater vehicle to penetrate an ice sheet and use of the penetration created according to an example embodiment of the present disclosure;

FIGS. 8A-B illustrate deployment of a vertically launched, tethered, ice-penetrating recoverable communications buoy according to an example embodiment of the present disclosure;

FIG. 9 illustrates deployment of a vertically launched ice-penetrating communications buoy having a payload according to an example embodiment of the present disclosure;

FIG. 10 illustrates an ice-penetrating buoy with a tethered sub-surface component deployed into a thermocline layer according to an example embodiment of the present disclosure;

FIG. 11 illustrates an example embodiment of an unmanned underwater vehicle deploying a sonobuoy from a launch bay of the unmanned underwater vehicle according to an example embodiment of the present disclosure;

FIG. 12 illustrates an example embodiment of an unmanned underwater vehicle recovering a sonobuoy from a recovery bay of the unmanned underwater vehicle according to an example embodiment of the present disclosure;

FIG. 13 illustrates a sub-surface component operating in the Cold Sound Duct as an acoustic modem, with deployed sonobuoys functioning as communications relay buoys according to an example embodiment of the present disclosure;

FIG. 14 illustrates an array of sonobuoys deployed by an unmanned underwater vehicle in an underwater, under-ice environment according to an example embodiment of the present disclosure;

FIG. 15 illustrates the operation of an air-launched ice-penetrating buoy including creation of a bore and deployment of a sub-surface component according to an example embodiment of the present disclosure;

FIG. 16 illustrates the operation of an air-launched ice-penetrating buoy including creation of a bore using a shaped charge and deployment of a sub-surface component according to an example embodiment of the present disclosure; and FIG. 17 illustrates a schematic diagram of an example apparatus which is implemented to perform the functions of a controller according to an example embodiment of the present disclosure.

DETAILED DESCRIPTION

Example embodiments of the present disclosure now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Embodiments of the present disclosure generally relate to an unmanned underwater vehicle (UUV) that includes elements specifically configured for operation in an Arctic environment, such as under ice sheets floating at the surface of an ocean. The challenges of operation of a UUV in such environments will be described further below; however, embodiments described herein provide methods, apparatuses, and systems that facilitate operation of a UUV through compensating and overcoming obstacles and issues relating to operation in an Arctic environment.

The Arctic region is taking on expanded strategic and commercial importance as climate change opens new navigable sea lanes and permits greater access to natural resources. Conventional (non-nuclear powered) submarines, including UUVs, are not well-suited for operation in the Arctic region; their operation under the ice sheet has been limited by constraints on vehicle power and communications, and particularly for unmanned vessels, the ability to control them. Embodiments described herein are adapted to overcome the challenges of operation in the Arctic region and under the ice sheet.

Operation of manned vehicles in the Arctic region is limited, and unmanned underwater vehicles can be used where manned underwater vehicles are not practical or desirable. While UUVs can operate autonomously as autonomous underwater vehicles (AUV), communication is still necessary between UUVs or AUVs and a controller in the form of a command center. Communication with UUVs while under water and particularly while under ice can be challenging. When surfaced, UUVs can communicate with control elements via satellite or through line-of-sight communication. When submerged, communication between UUVs and control elements may be performed via acoustic modems. In the open ocean, temporary acoustic networks can be deployed by aircraft or surface vessels to aid in undersea communications. However, when operating in the Arctic region, particularly under ice, these communication methods become infeasible. Surfacing of a UUV to communicate may not be possible when the UUV is below ice, particularly when below the thick Arctic ice pack. Moreover, the lack of established permanent Arctic acoustic networks, and ease with which an adversary may disrupt any fixed networks, precludes undersea communications in the Arctic region.

Embodiments described herein provide methods, apparatuses, and systems for UUV operation in Arctic regions, and provides methods and systems of deploying subsea acoustic communication networks in the presence of sea ice. An example embodiment provides for aerial deployment of one or more acoustic modem devices that perforate the ice using a heated metal penetrator or a shaped charge. Another example embodiment uses image reconstruction to guide air-deployable acoustic modems to open water, such as leads and polynyas that occur within sea ice expanses. Polynyas are stretches of open water surrounded by ice while leads are narrow cracks in the ice that form when ice floes diverge or shear as they move parallel to each other. Devices of example embodiments communicate with mobile, UUV-deployable acoustic relays that exploit under-ice acoustic channels, allowing long distance communication with UUVs.

According to embodiments described herein employing diesel-electric power, an example embodiment deploys one or more ice-penetrating devices to access air for use in combustion in the diesel-electric propulsion system that enables a UUV to charge batteries aboard the UUV. The one or more ice-penetrating devices of such embodiments functions as a snorkel. Such ice-penetrating techniques also enable UUVs to deploy acoustic modems and satellite communication relay devices with a satellite antenna reaching the surface of the ice cover and an acoustic modem suspended below.

The UUVs of some example embodiments deploy and recover a network of acoustic sensors under ice that maintain relative and absolute positions. This is accomplished using self-mobile sensors and sensors anchored to sea ice or to the sea floor including some sensors with ice-penetrating capabilities for satellite communication.

An example embodiment of a UUV 100 is illustrated in FIG. 1. The UUV illustrated is one example embodiment and the configuration of the illustrated embodiment is not limiting, but an example of a UUV configured for operation in the Arctic region. As shown, the UUV 100 includes a hull 110 with dive planes 115, a rudder 120, and a propellor or screw 125 which is shielded in the illustrated embodiment. The UUV of FIG. 1 is further configured with shock-absorbing, retractable guide rails 150. The guide rails 150 of the illustrated embodiment include a leading portion 152 and a trailing portion 154. The guide rails 150 provide protection for the UUV when it encounters the underside of an ice sheet. The guide rails 150 provide protection for a mast assembly, sail (similar to the familiar conning tower of Second World War-era submarines) or other dorsal protuberances such as an upward-facing fathometer that may be present on a top surface of the UUV. Further, the guide rails 150 protect the hull 110 and the screw 125 from impacting the underside of the ice sheet. The guide rails 150 of the illustrated embodiment of FIG. 1 are not necessarily to scale with respect to the hull 110 of the UUV 100. The guide rails 150 are configured to have minimal impact on the UUV center of buoyancy when in either the raised or lowered position.

FIG. 2 illustrates the UUV 100 of FIG. 1 with the guide rails 150 in a raised position, whereas FIG. 3 illustrates the UUV 100 with the guide rails 150 in the lowered position. The guide rails of an example embodiment are configured to extend to the raised position and retract to the lowered position using telescoping legs 156. The legs 156 of an example embodiment include multiple nested segments whereby the legs telescope by extending the nested segments, and retract by collapsing the nested segments. Optionally, embodiments include legs 156 that are received within the hull 110 such that extension of the legs occurs through driving of the legs out of the hull. The screw 125 of FIG. 1 is protected by a shroud 127 visible in the profile view of FIG. 2.

With the legs 156 in the extended, raised position, the guide rails 150 provide protection for the UUV from impacts that may otherwise damage the UUV. FIG. 4 illustrates the functionality of the guide rails 150 in the raised position with an ice sheet 200 including an underside 205 of the ice sheet, and several relative positions of a UUV. UUV 210 is illustrated in a position below the underside 205 of the ice sheet 200 where the UUV 210 travels. The guide rails of UUV 210 protect the UUV from unexpected dips in the ice sheet 200. UUV 220 is illustrated in a position with the guide rails in contact with the underside 205 of the ice sheet 200. This position of UUV 220 occurs when the UUV is traveling very close to the ice sheet, or when the UUV contacts the underside of the ice sheet to deploy a communications device or to access air above the ice sheet as described further below. In the position shown by UUV 220, the UUV does not need to maintain a particular depth and can statically engage the ice sheet while the hull of the UUV and components thereof remain safe from contact or impact. Optionally, a UUV in the position of UUV 220 anchors to the ice sheet 200 through use of an element that engages the ice sheet, such as a screw or auger, to maintain a stationary position relative to the ice sheet.

The guide rails in the raised position further provide protection of the UUV when the UUV encounters the ice sheet at a pitch angle. UUV 230 is shown in a downward pitch with the guide rails protecting the screw and the shroud protecting the screw, while UUV 240 is shown in an upward pitch with the guide rails protecting a nose of the hull of the UUV. Thus, the guide rails allow a UUV to approach the underside 205 of an ice sheet 200 and allow contact between the UUV and the ice sheet. The leading portion 152 of the guide rails 150 is angled relative to the flat portion of the guide rails substantially parallel to the hull 110 such that they aid movement of the UUV 100 under an ice sheet. The angled leading portion 152 helps protect the hull when the UUV is not at an even ballast and when there are sudden changes in thickness along the underside of the ice sheet. The angled trailing portions 154 provide similar protection and further protect the screw 125 from damage when the UUV is at an uneven ballast and when the UUV is operating in reverse against changes in ice sheet topography. The guide rails prevent damage to the sail (conning tower), sonar dome, and mast superstructure of a UUV even when the UUV is pitched fore or aft.

Referring back to FIG. 2, the guide rails 150 of an example embodiment further include shock absorbing functionality. This shock absorbing functionality of an example embodiment is achieved through the telescoping legs 156 not being rigidly held in the extended position, but instead the legs 156 are biased in the extended position. The telescoping legs absorb impact through a biasing force that extends the legs 156. According to an example embodiment, the biasing force is achieved through hydraulic pressure used to extend the legs. According to another example embodiment, the biasing force is achieved through a mechanical shock absorbing feature such as springs. The shock absorbing functionality of the guide rails 150 prevents jarring impacts on the hull 110 of the UUV 100 when the guide rails 150 impact the underside of an ice sheet or other obstacle.

The ability of the guide rails 150 to be raised and lowered through telescoping legs 156 includes functionality beyond that of providing a degree of shock absorption. UUVs used for strategic operations such as military, surveillance, or other covert operations rely on a lack of detectability in the water. In the case of a diesel-electric propulsion system or any propulsion system requiring air induction, such as for combustion, UUV snorkeling is used to draw in air to the UUV. FIG. 5 illustrates an example embodiment of the UUV 100 in a snorkeling position using conduit 160 to reach above the surface of the water 180. The conduit 160 is attached at a first end 162 to the UUV 100, and includes a second, open end 164. The open end 164 of an example embodiment includes a feature to discourage water intrusion to the conduit while enabling airflow through the conduit. Such a feature optionally includes a cap with a one-way valve, a series of angled, overlapping louvers, or a mushroom cap, for example. An example embodiment of a conduit 160 includes a mechanism by which the open end 164 of the conduit is sealed when the conduit is submerged. Such a mechanism to seal the conduit optionally includes a valve such as a ballcock valve or a head valve where the valve is held open against a spring by compressed air, but shuts when water is detected by sensors proximate the open end 164. The guide rails 150 are depicted in FIG. 5 in the lowered, retracted position and are below an end of the conduit 160 that breaks the surface of the water 180. In this lowered position, the guide rails 150 do not break the surface of the water 180 when the UUV 100 is snorkeling. The position of the raised guide rails 151 is depicted in broken lines, illustrating that if the guide rails 150 were in the position of the raised guide rails 151, the guide rails would break the surface during snorkeling and render the UUV much more detectable based on the guide rails protruding from the surface of the water 180 and from any wake that they would create as the UUV travels through the water. Thus, the retractable guide rails 150 provide an added advantage of maintaining a low level of detectability when the UUV is snorkeling.

The UUV of an example embodiment provided herein further includes an ice-penetrating mast. FIGS. 6A-C illustrates an example embodiment of the UUV 100 including a vertically-deployed ice-penetrating mast 300. As shown, the ice-penetrating mast 300 of the illustrated embodiment is stowed in FIG. 6A in a stowed position. When the UUV 100 is in a position and prepared for deployment of the ice-penetrating mast, such as when the UUV 100 is stationary with the guide rails 150 positioned against the underside of an ice sheet, the ice-penetrating mast 300 of the example embodiment advances toward a deployable position as shown in FIG. 6B, and reaches a deployable position as shown in FIG. 6C. In the deployable position of FIG. 6C, the ice-penetrating mast 300 is in a position to begin penetrating the ice sheet against which the guide rails 150 are positioned.

Figure 7A:
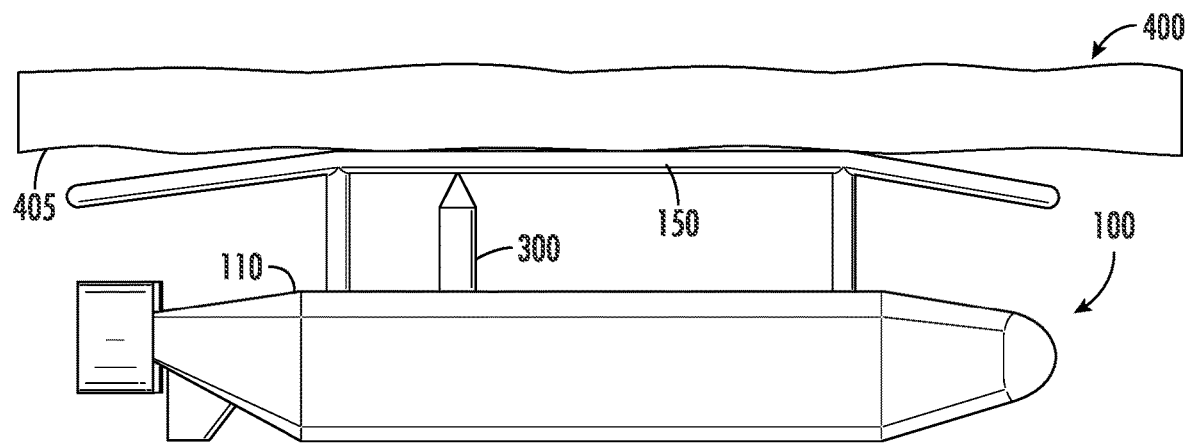
Figure 7B:
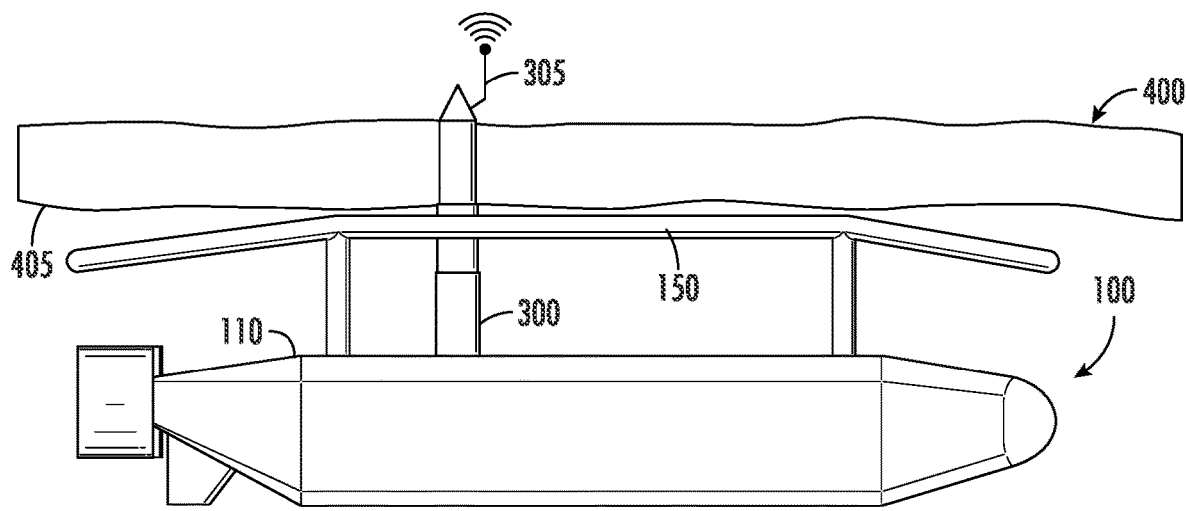

While the example embodiment of FIGS. 6A-C depict an ice-penetrating mast 300 that pivots into a deployable position, an example embodiment optionally includes an ice penetrating mast that is stowed within the hull of the UUV in a deployable position, and is ready for deployment when the UUV is appropriately positioned. The deployable position for an ice-penetrating mast 300 includes positioning the ice-penetrating mast such that it can extend vertically and engage the underside of the ice sheet. FIG. 7A illustrates the UUV 100 positioned with the guide rails 150 adjacent to or in contact with the underside 405 of an ice sheet 400 with the ice-penetrating mast 300 in the deployable position. FIG. 7B illustrates the ice-penetrating mast 300 in the deployed position, penetrating through the ice sheet 400 and reaching the surface above the ice sheet 400. As illustrated, upon reaching the surface above the ice sheet 400, an antenna 305 is deployed for communication between the UUV 100 and other entities, such as a central command or aircraft. Communication of one example embodiment from the antenna 305 is via a satellite. The ice-penetrating mast of an example embodiment includes a heated tip used to melt a hole through the ice to penetrate the ice sheet 400. Optionally, according to an example embodiment, the tip of the ice-penetrating mast is configured to drill through the ice sheet 400 to reach the surface above the ice sheet.

The ice-penetrating mast 300 of an example embodiment deploys to a limited height, such that the UUV can detect the thickness of an ice sheet above the UUV through use of various techniques such as radar. Optionally, ice sheet thickness is determined by aircraft or satellites above the ice sheets, where ice sheet thickness is mapped, and locations are established where the ice sheet is sufficiently thin that the ice-penetrating mast is used effectively. The UUV of an example embodiment is guided to a location where the ice sheet is sufficiently thin that the ice-penetrating mast 300 will penetrate through the ice sheet to reach the surface of the ice sheet. According to an example embodiment, the UUV is capable of measuring ice thickness, such as using an inverted or upward-facing fathometer. The inverted fathometer includes active sonar transducers using different and generally higher frequencies than a transducer used in a forward sonar dome of a UUV. An example embodiment employs several transducers along a dorsal or top side of the UUV to measure ice thickness.

The ice-penetrating mast 300 of an example embodiment incorporates therein the antenna 305. Optionally, the ice-penetrating mast includes a conduit for combustion air for running a diesel engine aboard the UUV 100. Although such a conduit is illustrated separately below, an example embodiment incorporates the conduit into the ice-penetrating mast 300. The ice-penetrating mast 300 of an example embodiment includes sensors that capture data at the surface of the ice sheet 400. For example, the ice penetrating mast includes one or more of a camera or image sensor, a LiDAR (light distancing and ranging) sensor, a microphone, or any other sensor that gathers useful information from the surface of the ice sheet.

Figure 7C:
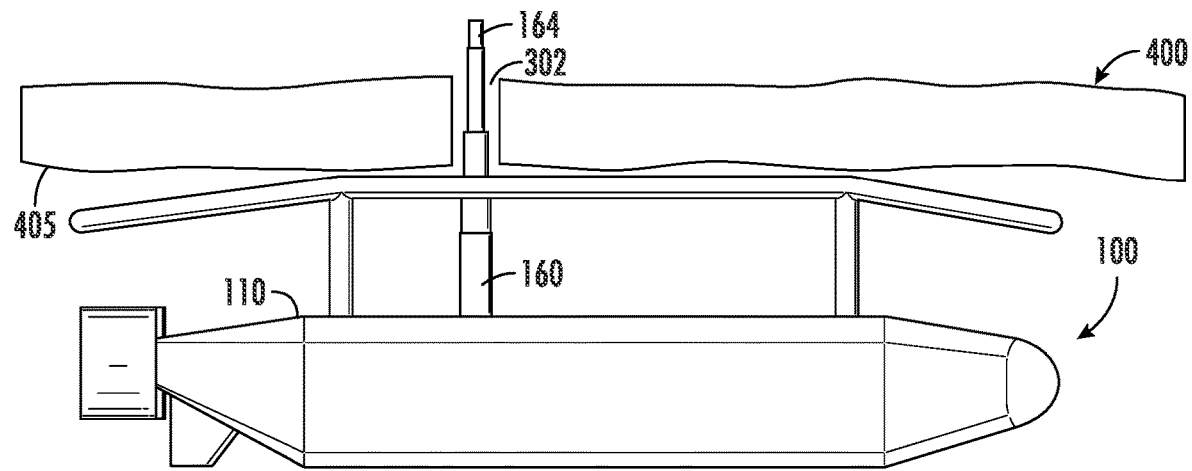
Figure 7D:
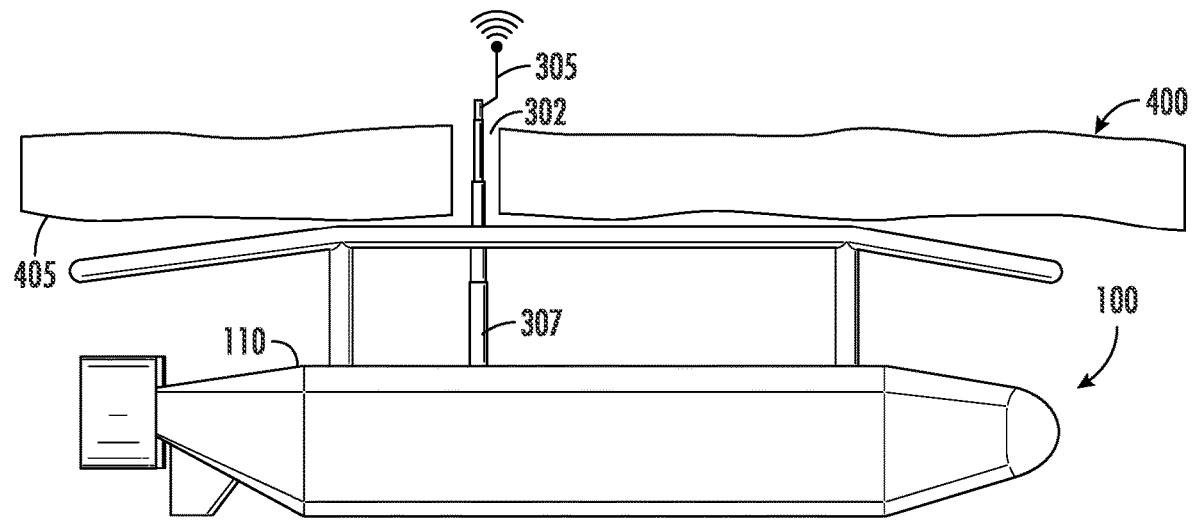

While the vertically-deployed ice-penetrating mast 300 of an example embodiment of the aforementioned embodiment incorporates a conduit, another example embodiment separately deploys a conduit after penetrating the ice sheet. FIG. 7C illustrates such an example embodiment where a penetration 302 formed by the ice-penetrating mast 300 is used to extend there through the conduit 160 such that the open end 164 of the conduit extends through the penetration 302 to reach above the surface of the ice sheet 400 for intake of air. Similarly, while the above-described embodiment includes an antenna 305 incorporated into the ice-penetrating mast 300, another example embodiment separately deploys an antenna. FIG. 7D illustrates an example embodiment in which the penetration 302 formed by the ice-penetrating mast 300 is used to extend there through an antenna mast 307 from which an antenna 305 is deployed above the surface of the ice sheet 400 to enable communication from the UUV 100 via the antenna 305.

Example embodiments described herein further provide for a vertically-launched, tethered, ice-penetrating recoverable communications buoy. Such a communications buoy is deployed from UUVs as described herein, where the communications buoy includes a heated melting head or ice drill to penetrate through an ice sheet. The body of an example communications buoy is capable of being heated to ensure the communications buoy is recoverable and does not get frozen into the ice sheet. The tether of an example embodiment is used to provide power from the UUV to the communications buoy.

According to an example embodiment, a UUV probes the ice sheet to identify relatively thinner areas within the ice sheet capable of being penetrated by a vertically launched, tethered, ice-penetrating recoverable communications buoy. Upon identifying an area where the ice sheet thickness is sufficiently thin, the UUV vertically launches the tethered, ice-penetrating buoy. FIG. 8A illustrates an example embodiment of deployment of a vertically launched, tethered, ice-penetrating recoverable communications buoy 420 from the UUV 100. After the vertical launch, an example embodiment described herein reaches the underside 405 of the ice sheet 400, and begins penetration. The penetration of an example embodiment includes a heated head or ice drill as described above. Once the vertically launched, tethered, ice-penetrating recoverable communications buoy 420 reaches the surface above the ice sheet 400, the communications buoy begins communicating. The vertically launched, tethered, ice-penetrating recoverable communications buoy 420 optionally includes a deployable antenna 422 such that when the buoy reaches the surface above the ice sheet 400, the antenna 422 is deployed to begin communicating.

While the above-described embodiment includes a recoverable vertically launched, tethered, ice-penetrating communications buoy, embodiments provided herein further include vertically launched, expendable ice-penetrating buoys. Such an expendable ice-penetrating buoy is used, in some example embodiments, as a communications buoy or a sonobuoy. An expendable ice-penetrating buoy can include a tether that is severable or not require a tether depending upon the intended use of the expendable ice-penetrating buoy.

Whether the vertically launched ice-penetrating communications buoy is tethered or not, and whether it is recoverable or expendable, an example embodiment described herein includes a sub-surface component that is used as one or more of an acoustic modem below the ice or below the surface of the water, a hydrophone, a bathythermograph, a transducer, etc. FIG. 9 illustrates an example embodiment of a deployed ice-penetrating buoy 425 from which a payload was deployed. In the illustrated embodiment, the payload includes a sub-surface component 430 tethered to the ice-penetrating buoy 425 through tether 435. The sub-surface component 430 of an example embodiment descends to a predefined depth that is determined by either the UUV 100 or the ice-penetrating buoy. The position of the sub-surface component 430 of an example embodiment is dependent upon the intended use. The ice-penetrating buoy 425 of an example embodiment further includes a deployable antenna 427 used to facilitate communication between the buoy, the UUV 100, and a central command or mission controller.

FIG. 10 illustrates the deployed ice-penetrating buoy 425 and the tethered sub-surface component 430. Further illustrated, though not to scale, are different zones within the water below the ice sheet 400 as typically found in the Arctic region. Immediately below the ice sheet 400 is a thermocline layer 450 of very cold surface water. Below the layer 450 of very cold surface water is a thermocline layer 460 of warm water flowing from the Bearing Sea. Below this thermocline layer 460 of warm water is a thermocline layer 470 of cold water known as the Cold Sound Duct at a depth of around 100 meters. Below the Cold Sound Duct thermocline layer 470 is relatively warm water thermocline layer 480 flowing from the Atlantic Ocean. The Cold Sound Duct thermocline layer 470 provides dense, cold water in which signals propagate up to 250 miles from their source. This Cold Sound Duct thermocline layer 470 is conducive to underwater communications, such that the sub-surface component 430 of the illustrated embodiment is positioned within the Cold Sound Duct as an acoustic modem. Positioning an acoustic modem within the Cold Sound Duct provides improved communications range and quality, thereby improving the functionality of an underwater communications system.

In addition to the ice-penetrating buoys described above, embodiments of the UUV described herein are further capable of deploying mobile/recoverable sonobuoys that are deployed from a UUV payload module. The sonobuoys of an example embodiment provided herein is maneuverable and autonomous with full navigation capabilities. Sonobuoys are small relative to the UUV and include limited power capacity; however, they are capable of movement within a range and capable of remaining geostationary despite water currents. The sonobuoy capabilities of example embodiments described herein are selected based on the mission or planned use. Sonobuoys include passive sonar sonobuoys, active sonar sonobuoys, acoustic communications nodes, and special purpose sonobuoys. The sonobuoys of example embodiments described herein are used under the surface of the water and under sheets of ice. As the sonobuoys of example embodiments do not need to breach the surface of the water, they are well-suited to under-ice operations as described herein. Once the sonobuoys have been deployed and used for their intended purpose, they are collected by the UUV through a recovery operation that enables the sonobuoys to be re-used for further missions and operations.

FIG. 11 illustrates an example embodiment of the UUV 100 deploying a sonobuoy 500 from a launch bay 112 of the UUV. The hull 110 of the UUV 100 of an example embodiment includes a volume within the hull where a plurality of sonobuoys 500 are staged for deployment. Recovery of the sonobuoys of an example embodiment is illustrated in FIG. 12, where the sonobuoy 500 navigates to the UUV 100, the UUV 100 navigates to the sonobuoy 500, or some combination thereof, and a recovery bay 114 is opened to receive the sonobuoy therein. According to an example embodiment, the recovered sonobuoy 500 is stored within the recovery bay until the sonobuoy is prepared for further deployment. The sonobuoys of an example embodiment use battery power to power propulsion aboard the sonobuoy to navigate and/or to maintain a geostationary position. This battery power depletes over time, such that the sonobuoys of example embodiments require recharging before they can be deployed again. The recovery bay 114 of an example embodiment receives the charge-depleted sonobuoys within a charging dock to recharge the sonobuoy battery in preparation for re-deployment of the sonobuoy through the launch bay 112.

The sonobuoys of an example embodiment are employed as communications relays. FIG. 13 illustrates an example embodiment in which the sub-surface component 430 operates in the Cold Sound Duct as an acoustic modem, with deployed sonobuoys 500 functioning as communications relay buoys. This configuration enables long-distance under-ice communication suitable for when the ice sheet 400 is too thick for communications to penetrate. This communications network allows communications over long distances in an efficient and reliable manner. Accordingly, a UUV 100 and underwater communication system are provided, which includes a UUV deployed beneath an ice sheet and one or more deployable buoys. The one or more deployable buoys, when deployed by the UUV at predetermined intervals and at a predetermined depth beneath the ice sheet, form an extended range communication network with the UUV beneath the ice sheet.

In addition to use as a long-distance under-ice communications network, sonobuoys of an example embodiment are deployed in an array. The array of sonobuoys detects objects within range of the array, such as the detection of an adversarial vessel. FIG. 14 illustrates an example embodiment of an array of sonobuoys 500 deployed by a UUV 100 in an underwater, under-ice environment. As shown, the array of sonobuoys 500 detects the adversarial vessel 490 and communicates the detection back to the sub-surface component 430 and/or the UUV 100 such that any appropriate action is taken in response to the detection.

According to example embodiments described herein, a network of sonobuoys 500 or one or more acoustic modems facilitate navigation of a UUV when traveling under an ice sheet 400. Conventional locating means, particularly those that require visibility of a satellite (e.g., global positioning systems) are not feasible under water, and are inaccessible below ice sheets. The communications network established using embodiments described above provides a mechanism by which a UUV can navigate below ice sheets with accurate location identification. Properly locating the UUV is critical for navigation and for operational and strategic missions.

Mission planning for traversal of the Arctic region by a UUV of example embodiments described herein begins, according to an example embodiment, with an aerial survey of the ice sheet to identify where polynyas and leads exist in ice sheet. These locations provide opportunities for raising the conduit which is in some embodiments part of the ice-penetrating mast 300. According to some embodiments, the ice sheet thickness is measured by satellite or aircraft to identify areas of relatively thin ice where the ice-penetrating mast 300 and/or the ice-penetrating buoys described above can be deployed. Using these locations of thin ice, polynyas, and leads, the path of the UUV under the ice shelf is established.

According to an example embodiment, aircraft-deployed ice-penetrating buoys are used in combination with the embodiments above to expand a communications network in the Arctic region. Air-deployable ice-penetrating buoys are deployed and optionally steered to locations of thin ice or areas where no ice exists. For example, with reference to FIG. 15, a buoy 510 launched from an aircraft weapons bay at 501 descends and is guided to a soft landing on a smooth surface shown at 502 which includes landing struts 515 in a deployed position. The buoy on the surface of the ice sheet as shown at 503, and begins at 504 creating a bore 520 through the ice sheet 400 to reach the water beneath the ice sheet. The creation of the bore 520 is performed by any one of a variety of techniques including drilling/auguring, melting (e.g., via a melt head or by a flame/exhaust generated by the buoy 510), or explosives such as shaped charges. Once the bore 520 is created, a sub-surface component 530 is deployed with tether 535 to a predetermined depth below the ice sheet 400 as shown at 505. The buoy 510 of the illustrated embodiment deploys an antenna 540 at 506 and communication is enabled.

FIG. 16 illustrates an example embodiment of the use of shaped charges for creating a bore through the ice sheet. As shown at 507, the buoy 510 detonates a shaped charge 550 directed down toward the ice sheet 400. A deflector, such as a conical melter head, deflects back blast 555 from the shaped charge detonation. A small propellant charge 560 is optionally fired upward from the top of the buoy 510 as shown at 508 to counter the impulse delivered by the back blast of the shaped charge detonation. According to an example embodiment shown at 509, a small propellant charge 565 is used to remove vestigial shaped charge elements 570 from a melter head path above the bore 520. A small propellant charge 575 of an example embodiment is fired upward to drive the melter head and assembly of the buoy 510 into the ice as shown at 511. The buoy 510 of an example embodiment is then positioned to deploy the sub-surface component 530 with the tether 535 as shown at 512.

The UUV of an example embodiment includes a controller to control operations of the UUV, such as navigation, propulsion, deployment of buoys, communication, etc. The controller of the example embodiment can be embodied by a number of different computing/processing systems which are specifically configured to perform the operations described above. FIG. 17 illustrates a schematic diagram of an example apparatus which is implemented to perform the functions of the controller described herein. As shown, the apparatus 600 is embodied by or associated with any of a variety of computing devices that include or are otherwise associated with an UUV as described above. According to an example embodiment, the computing device is a controller which at least partially controls autonomous or semi-autonomous features of the UUV. The apparatus 600 of an example embodiment is equipped with any number of sensors 620, such as a global positioning system (GPS), inertial navigation system (INS), accelerometer, image sensor, LiDAR (Light Distancing and Ranging) sensor, radar, pressure transducer, and/or gyroscope. These sensors are optionally used to sense information regarding the movement, positioning, or orientation of the UUV for use in navigation assistance and/or to facilitate deployment of ice-penetrating buoys or sonobuoys, as described herein according to example embodiments. The apparatus 600 of example embodiments is configured to control the navigational functions of the UUV, such as independent control of propulsion, steering, and buoyancy systems.

The apparatus 600 of an example embodiment includes, is associated with, or is otherwise in communication with a communication interface 640, processor 610, and/or a memory 630. In some embodiments, the processor (and/or co-processors or any other processing circuitry assisting or otherwise associated with the processor) is in communication with the memory device via a bus for passing information among components of the apparatus. The memory device of an example embodiment is non-transitory and includes, for example, one or more volatile and/or non-volatile memories. In other words, for example, the memory device is an electronic storage device (for example, a computer readable storage medium) including gates configured to store data (for example, bits) that are retrievable by a machine (for example, a computing device like the processor). The memory device of an example embodiment is configured to store information, data, content, applications, instructions, or the like for enabling the apparatus to carry out various functions in accordance with an example embodiment of the present invention. For example, the memory device is configured to buffer input data for processing by the processor. Additionally or alternatively, the memory device is configured to store instructions for execution by the processor.

The processor 610 of example embodiments is be embodied in a number of different ways. For example, the processor of an embodiment is one or more of various hardware processing means such as a microprocessor, a controller, a digital signal processor, or other processing circuitry including circuits such as an application specific integrated circuit, a field programmable gate array, a microcontroller unit, or the like.

The apparatus 600 of example embodiments includes a communication interface 640 that includes any means such as a device or circuitry embodied in either hardware or a combination of hardware and software configured to receive and/or transmit data to/from other electronic devices, such as communicating between an UUV associated with the apparatus 600 and a deployed buoys or a mission control vessel or controller. The communication of an example embodiment is performed over any available communication protocol, such as near field communication, cellular communication, sonar, Global System for Mobile Communications (GSM), or the like. The communications interface optionally supports wired communication for when the UUV is communicating with a tethered ice-penetrating buoy, for example. The memory 630 of an example embodiment is configured for storage of navigational information such as a geographical area to map and rendezvous points for returning to, such as locations of deployed sonobuoys, for example. Optionally, the memory 630 of an example embodiment stores computer program code for execution by the processor 610 to perform any of the aforementioned processes.

Many modifications and other embodiments of the inventions set forth herein will come to mind to one skilled in the art to which these inventions pertain having the benefit of the trainings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A system comprising:
   an unmanned underwater vehicle (UUV) comprising a hull, wherein the UUV comprises one or more attached guide rails positioned above the hull of the UUV, wherein the one or more attached guide rails are attached to the UUV;
   a vertically-deployed mast, wherein the vertically-deployed mast is configured to penetrate through an ice sheet forming a penetration; and
   a communications antenna, wherein the communications antenna is deployed to extend through the penetration in the ice sheet and enables communication above the ice sheet.

2. The system of claim 1,
   wherein the one or more attached guide rails positioned above the hull of the UUV define an extended position or a retracted position, wherein an attached guide rail of the one or more attached guide rails disposed in the extended position is disposed further from the hull than another attached guide rail of the one or more attached guide rails disposed in the retracted position.

3. The system of claim 2, further comprising
   a conduit attached to the UUV and extending above the UUV, wherein the conduit comprises an open end opposite a first end that is attached to the UUV, wherein the open end of the conduit extends above the one or more attached guide rails when the attached guide rail is in the retracted position, and below the one or more attached guide rails when the other attached guide rail is in the extended position.

4. The system of claim 3,
   wherein the conduit is configured to extend through the penetration in the ice sheet to conduct intake air for combustion in an engine of the UUV, wherein the engine of the UUV charges batteries that power propulsion of the UUV.

5. The system of claim 2,
   wherein the one or more attached guide rails are attached to the UUV with a shock absorbing feature, wherein the shock absorbing feature comprises hydraulic or mechanical shock absorbing legs.

6. The system of claim 1, further comprising
   one or more deployable buoys, wherein the one or more deployable buoys, when deployed by the UUV at predetermined intervals and at a predetermined depth beneath the ice sheet, form an extended range communication network with the UUV beneath the ice sheet.

7. The system of claim 6,
   wherein the one or more deployable buoys comprises one or more deployable sonobuoys, wherein the one or more deployable sonobuoys are deployed through a launch bay of the UUV and recovered through recovery bay of the UUV.

8. The system of claim 6,
   wherein at least one of the one or more deployable buoys comprises an ice-penetrating buoy, wherein the at least one of the one or more deployable buoys comprises an antenna deployed upon penetration of the ice sheet.

9. The system of claim 8,
   wherein the ice-penetrating buoy comprises a heated surface, wherein the heated surface is used to melt and penetrate the ice sheet.

10. The system of claim 8,
    wherein the ice-penetrating buoy comprises a payload of a sub-surface component, wherein the sub-surface component descends to another predetermined depth in response to being deployed.

11. The system of claim 10,
    wherein the sub-surface component is an acoustic modem, wherein the predetermined depth is determined based on a thermocline layer where signal transmission distance is determined to establish a communication network between the UUV and the acoustic modem.

12. An unmanned underwater vehicle (UUV) comprising:
a hull;
one or more guide rails extending from the hull and attached to the hull by one or more legs,
wherein the one or more guide rails are attached to the UUV;
a vertically-deployed mast, wherein the vertically-deployed mast is configured to penetrate through an ice sheet forming a penetration; and
a communications antenna, wherein the communications antenna is deployed to extend through the penetration in the ice sheet and enables communication above the ice sheet.

13. The unmanned underwater vehicle of claim 12, wherein the one or more guide rails are positioned above the hull of the UUV and define an extended position or a retracted position, wherein a guide rail of the one or more guide rails disposed in the extended position are disposed further from the hull than another guide rail of the one or more guide rails disposed in the retracted position.

14. The unmanned underwater vehicle of claim 13, wherein the one or more legs comprises telescoping legs, wherein the telescoping legs move the guide rail between the extended position or the retracted position.

15. The unmanned underwater vehicle of claim 14, wherein the telescoping legs are further configured to bias the guide rail in the extended position and to absorb shock from the guide rail, reducing shock experienced by the UUV when the guide rail impact an object.

16. The unmanned underwater vehicle of claim 12, further comprising
a plurality of deployable buoys, wherein the UUV comprises a launch bay to deploy the deployable buoys and a recovery bay to recover the deployable buoys.

17. The unmanned underwater vehicle of claim 12, further comprising
at least one deployable buoy, wherein at least one deployable buoy comprises an ice-penetrating buoy, wherein the ice-penetrating buoy comprises an antenna deployed upon penetration of the ice sheet.

18. A method for establishing a communications network comprising:
deploying, from an unmanned underwater vehicle (UUV), one or more ice-penetrating buoys;
penetrating an ice sheet with the one or more ice-penetrating buoys;
extending an antenna from the one or more ice-penetrating buoys in response to the one or more ice-penetrating buoys reaching a surface above the ice sheet;
deploying, from the UUV, one or more sonobuoys; and
communicating between the one or more ice-penetrating buoys, the one or more sonobuoys, and the UUV.

19. The method for establishing the communications network of claim 18, further comprising
communicating from the one or more ice-penetrating buoys, the one or more sonobuoys, and the UUV with a central command using the antenna extending above the surface of the ice sheet.

20. The method for establishing the communications network of claim 18, further comprising:
vertically-deploying a mast through the ice sheet using a heated surface of the mast to penetrate through the ice sheet; and
deploying an antenna from the mast to facilitate communications.

* * * * *